United States Patent
Harada et al.

(10) Patent No.: US 9,801,390 B2
(45) Date of Patent: Oct. 31, 2017

(54) DEVICE AND A METHOD FOR CIRCULARIZING CROISSANT DOUGH, A DEVICE AND A DEVICE AND A METHOD FOR FORMING CROISSANT DOUGH IN A U-SHAPE, AND A SYSTEM FOR PRODUCING CROISSANTS

(71) Applicant: Rheon Automatic Machinery Co., Ltd., Utsunomiya-shi, Tochigi (JP)

(72) Inventors: Nobuaki Harada, Utsunomiya (JP); Sadao Ueno, Utsunomiya (JP); Hitoshi Kuwabara, Utsunomiya (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 73 days.

(21) Appl. No.: 14/504,848

(22) Filed: Oct. 2, 2014

(65) Prior Publication Data
US 2015/0099049 A1 Apr. 9, 2015

(30) Foreign Application Priority Data
Oct. 4, 2013 (JP) .................... 2013-208900

(51) Int. Cl.
*A21C 3/08* (2006.01)
*A21C 9/08* (2006.01)
*A21D 13/80* (2017.01)

(52) U.S. Cl.
CPC ............ *A21C 3/08* (2013.01); *A21C 9/088* (2013.01); *A21D 13/80* (2017.01)

(58) Field of Classification Search
CPC .................. A21C 3/08; A21C 9/088
USPC ....... 425/323, 324, 320, 321, 334, 391, 393, 425/364 R, 441, 442, 145, 150, 171
See application file for complete search history.

(56) References Cited

U.S. PATENT DOCUMENTS 3,315,618 A * 4/1967 Groff ................. A21C 3/08
264/299
3,485,185 A * 12/1969 Brunner .............. A21C 3/08
425/323

(Continued)

FOREIGN PATENT DOCUMENTS

| EP | 0490190 | 11/1991 |
| EP | 0490190 | 6/1992 |
| EP | 0647404 | 4/1995 |

(Continued)

*Primary Examiner* — Seyed Masoud Malekzadeh
(74) *Attorney, Agent, or Firm* — Myers Andras LLP; Joseph C. Andras

(57) ABSTRACT

A device and a method for forming bar-shaped croissant dough in a U-shape, for then quickly and precisely arranging both legs of the U-shape to have the same length, and for producing croissants in a required shape are provided. A device for circularizing croissant dough 100 comprises a first guide for reducing a width 114 that moves a first end 5a of the U-shaped croissant dough 5 toward a center of the U-shape, a plate 118 that is inserted under a second end 5b of the U-shaped croissant dough 5 and lifts the second end 5b, a second guide for reducing the width 116 that moves the second end 5b that is lifted toward the center of the U-shape, and a pusher 130 that vertically presses the first end 5a and the second end 5b that are moved to the center of the U-shape so as to stick one to the other.

10 Claims, 19 Drawing Sheets

(56) References Cited

U.S. PATENT DOCUMENTS

| | | | | |
|---|---|---|---|---|
| 5,354,571 A | * | 10/1994 | Morikawa ................ | A21C 3/06 198/379 |
| 2007/0048423 A1 | * | 3/2007 | Bernhardt ................ | A21C 3/08 426/499 |

FOREIGN PATENT DOCUMENTS

| | | |
|---|---|---|
| JP | 2747778 | 2/1998 |
| WO | 2011/144191 | 11/2011 |
| WO | 2011144191 | 11/2011 |

\* cited by examiner (a)

(b)

(a)

(b)

(a)

(b)

(a)

(b)

(a)

(b)

(a)

(b)

(a)

(b)

(a)

(b)

(a)

(b)

Fig. 8-11
(a)
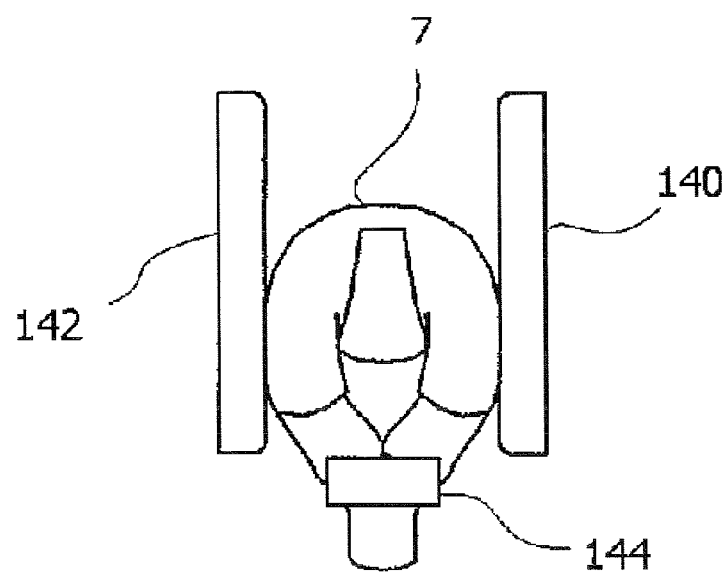
(b)
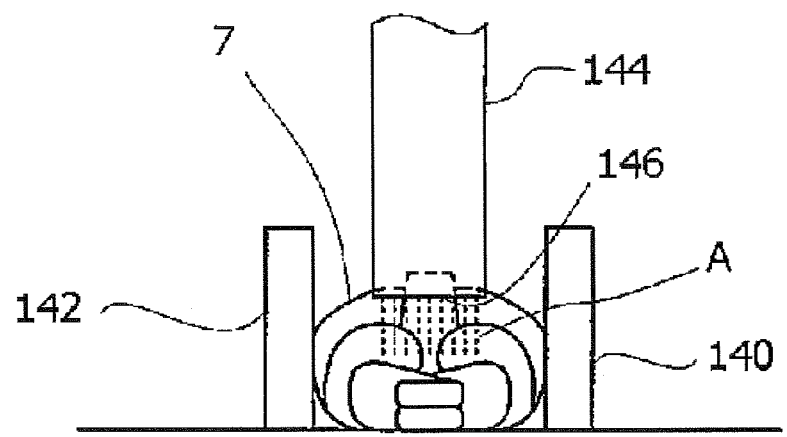

Fig. 8-12
(a)
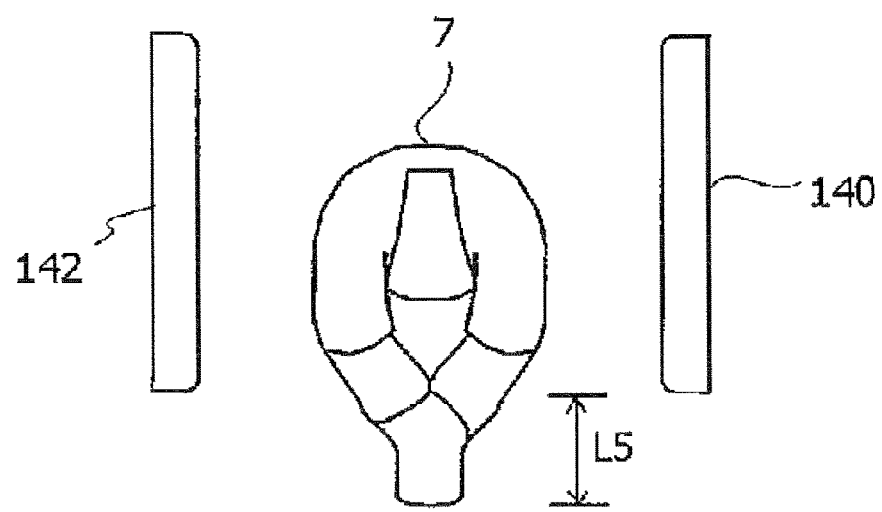
(b)
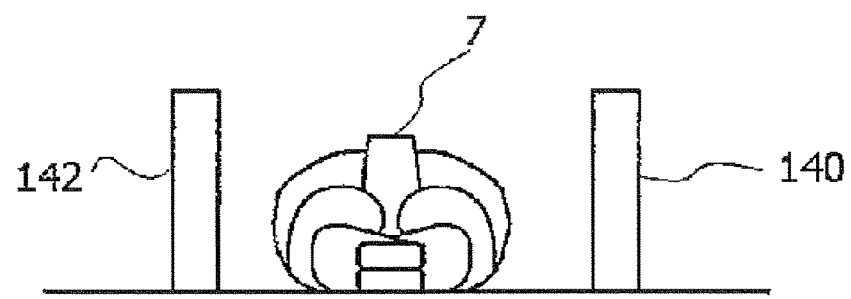

DEVICE AND A METHOD FOR CIRCULARIZING CROISSANT DOUGH, A DEVICE AND A DEVICE AND A METHOD FOR FORMING CROISSANT DOUGH IN A U-SHAPE, AND A SYSTEM FOR PRODUCING CROISSANTS

RELATED APPLICATIONS

This application claims priority to Japanese Patent Application No. 2013-208900, filed Oct. 4, 2013, hereby incorporated by reference in its entirety as if fully set forth herein.

BACKGROUND OF THE INVENTION

Technical Field

The present invention relates to a device for circularizing croissant dough, a device for forming croissant dough in a U-shape, a system for producing croissants, a method for circularizing croissant dough, and a method for forming croissant dough in a U-shape, each of which is suitable for production on a large scale.

Background Art

Croissants have been popularly known for their unique shape of a crescent or a circle in that the tips of the crescents are connected. Conventionally, a machine for forming croissants in such a shape has been developed. However, though the croissant dough is formed in that shape, it swells at a later process (a rising or baking process) to return to its original shape, such as a crescent or a bar. Thus a method for putting one tip of the crescent on the other tip and for bonding them by pressure has been known, to thereby maintain the shape of the croissant dough.

For example, by a method disclosed by European Patent Application Publication No. 0490190 (Publication 1), croissant dough is circularized by a pair of bending arms. One of the bending arms is equipped with a tab for lifting. When the pair of bending arms are swung about their respective base ends, the croissant dough that is formed like a bar by being rolled up is formed to follow the shape of the bending arms. The bending arm that is equipped with the lifting tab moves upward when it swings. Thus one end of the croissant dough is lifted by the lifting tab. Therefore, when the pair of bending arms swing so that their front ends close, the tips of the croissant dough that is circularized to follow the shape of the bending arms overlap. Subsequently, the portions that overlap are pressed by a plunger to be stuck together.

By a method disclosed by International Publication No. WO 2011/144191 (Publication 2), croissant dough is circularized by a pair of retaining jaws and a pair of shaping jaws. Both ends of bar-shaped croissant dough that has been rolled up are clamped by the retaining jaws and the shaping jaws. The pair of retaining jaws and the pair of shaping jaws are moved by a pair of pivot carriers so as to circularize the bar-shaped croissant dough. One of the pivot carriers moves upward when it swings. Thus one end of the croissant dough is lifted so that the ends overlap. Subsequently, the portions that overlap are pressed by a plunger to be stuck together.

Further, it is preferable to form symmetrical croissants. However, neither Publication 1 nor 2 discusses croissants being symmetrically formed. Japanese Patent No. 2747778 (Publication 3) discloses a method for symmetrically forming croissant dough. By that method bar-shaped croissant dough that has been rolled up passes through a space between a pair of hourglass rollers to be moved to the center in a conveyor that conveys the dough. The croissant dough is pushed at the center of its back side that is located at the center of the conveyor by a member that moves along the center of the conveyor in the direction for conveyance. It is squeezed into a space between a pair of belts that inwardly incline in the downstream direction. The pair of belts form the croissant dough in a symmetrical shape.

However, by the method of Publication 1, since the pair of bending arms swing about the base ends, the croissant dough cannot pass through the space between the bending arms. Thus the bar-shaped croissant dough is dropped into that space from the rollers that are located above the bending arms. Since by such a method the position of the bar-shaped croissant dough is not constant, it is difficult to form it in the required shape. Thus the method is impractical.

By the method of Publication 2, setting the forces to clamp the croissant dough by the retaining jaws and the shaping jaws is difficult. The portion of the croissant dough that is clamped is often crushed. Further, since the croissant dough is clamped to be lifted, the operating speed is limited and the capacity for production is restricted. Further, the device for carrying out the method is complicated and large. These are problems.

By the method of Publication 3, since the croissant dough that has been rolled up has a thick center that is difficult to bend, it is not always formed symmetrically, depending on its Elasticity (the hardness of the inside of the dough). (The term "Elasticity" means elasticity or hardness when it is inwardly pressed.) This is a problem.

The present invention aims to provide a device and a method for quickly and stably circularizing croissant dough.

The present invention also aims to provide a device and a method for forming bar-shaped croissant dough in a U-shape, then quickly and precisely arranging both legs of the U-shape to have the same length, and producing croissants in the required shape.

SUMMARY OF THE INVENTION

To solve these problems, a device for circularizing croissant dough of the present invention is, for example as shown in FIG. 1 and FIGS. 8-1 to 8-12, the device for circularizing croissant dough 100 that circularizes rolled-up croissant dough 5 that has been bent at the center to be formed in a U-shape and is conveyed by a conveyor 120. It comprises a first guide for reducing the width 114 that moves a first end 5a of the U-shaped croissant dough 5 toward the center of the U-shape, the first guide linearly moving toward, and retracting from, the center. It also comprises a plate 118 that is inserted under the second end 5b of the U-shaped croissant dough 5 and lifts the lower face of the second end 5b above the upper face of the first end 5a. It also comprises a second guide for reducing the width 116 that slides on, and relative to, the plate 118 to move the second end 5b that is lifted toward the center of the U-shape, the second guide linearly moving toward, and retracting from, the center. It also comprises a pusher 130 that vertically presses the first end 5a and the second end 5b that are moved to the center of the U-shape so as to stick one to the other.

The device for circularizing the croissant dough 100 may, for example as shown in FIG. 1 and FIGS. 8-1 and 8-2, further comprise a pair of holders 110, 112 that enfold the U-shaped croissant dough 5 from both sides.

In the device for circularizing the croissant dough 100, for example as shown in FIGS. 8-1 and 8-2, the holder 110 of the pair of holders 110, 112 that is positioned near the first end 5a may be integrated with the first guide for reducing the width 114 so that the U-shaped croissant dough 5 is enfolded by the pair of holders 110, 112 at the same time as the first end 5*a* is moved to the center of the U-shape by the first guide for reducing the width 114.

The device for circularizing the croissant dough 100 may, for example as shown in FIG. 1, comprise a conveyor 122 that conveys the U-shaped croissant dough 5 to the working positions for the first guide for reducing the width 114, the plate 118, the second guide for reducing the width 116, and the pusher 130 and a sensor for detecting the croissant dough 138 that detects the U-shaped croissant dough 5, to thereby generate a signal. The conveyor 122 may be stopped based on a signal from the sensor for detecting the croissant dough 138. The timing to stop the conveyor 122 may be adjustable.

In the device for circularizing the croissant dough 100, the timing to vertically press the first end 5*a* and the second end 5*b* together by the pusher 130 or the distance to lower the pusher 130 to press the first end 5*a* and the second end 5*b* together, or both, may be adjustable.

In the device for circularizing the croissant dough 100, for example as shown in FIGS. 8-3 to 8-5, the first guide for reducing the width 114 may have a face 114*f* for moving the first end 5*a* and the second guide for reducing the width 116 may have a face 116*f* for moving the second end 5*b*. After the second end 5*b* is moved to the center of the U-shape, the plate 118 may return to the level that it had before it started to move upward. The second guide for reducing the width 116 may move downward at the distance h, which is the same as the distance that the plate 118 returns to the level that it had before it started to move upward. The face 114*f* for moving the first end 5*a* and the face 116*f* for moving the second end 5*b* may form walls on both sides of the first end 5*a* and the second end 5*b* that are moved to the center of the U-shape. The pusher 130 may vertically press the first end 5*a* and the second end 5*b* between the walls.

The device for circularizing the croissant dough 100 may, for example as shown in FIG. 1 and FIG. 8-10, further comprise a second pusher 144 that is wider than the distance between the walls 114*f*, 116*f* and that further presses the first and second ends 7*a*, 7*b* that have been vertically pressed by the pusher 130 to be stuck together.

In the device for circularizing the croissant dough 100, for example as shown in FIG. 8-6, the pusher 130 may have a hole for blowing air 136 on the face for vertically pressing the first end 5*a* and the second end 5*b* so that, after having the first end 5*a* and the second end 5*b* stick together, the pusher 130 upward moves while blowing air A through the hole 136.

To solve the problems, a device for forming the croissant dough in a U-shape as in the present invention is, for example as shown in FIGS. 1, 2, and 7, the device for forming the croissant dough in a U-shape 10 that supplies the U-shaped croissant dough 5 to any of the devices for circularizing the croissant dough 100 that is discussed above. It comprises a conveyor 20 that conveys rolled-up croissant dough 3 that is placed so that the longitudinal direction of the croissant dough is perpendicular to the direction for conveyance. It also comprises a pair of side belts 40, wherein one side belt is provided on each side of the conveyor 20. The pair of side belts 40 contact the respective legs of the U-shaped croissant dough 5 to transport the croissant dough 5 in the direction for conveyance. It also comprises a center pin 32 that pushes the center of the length of the croissant dough 3 that is conveyed by the conveyor 20 in the direction for conveyance so as to feed the croissant dough 3 to the pair of side belts 40. It also comprises a sensor 48 that measures the lengths of, or a distance between the ends of, the legs of the U-shape. In the device for forming the croissant dough in a U-shape 10, based on the lengths L1, L2 of the legs of the U-shape or the distance between the ends of the legs of the U-shape measured by the sensor 48 the rates for transporting the U-shaped croissant dough 5 by the side belts 40*a*, 40*b* of the pair of side belts 40 are adjusted to arrange the lengths L1*e*, L2*e* of the legs of the U-shape to have the same length.

The device for forming the croissant dough in a U-shape 10 may, for example as shown in FIGS. 1 and 2, further comprise a water feeder 70 that attaches water to a part of the first end 5*a* or the second end 5*b*, which ends are to be stuck together.

In the device for forming the croissant dough in a U-shape 10, the contacting condition between the pair of side belts 40 and the croissant dough 5 is less slippery than the contacting condition between the conveyor 20 and the croissant dough 5 for conveying the croissant dough 5.

To solve the problems, a system for producing croissants of the present invention comprises, for example as shown in FIG. 1, any of the devices for circularizing the croissant dough 100 that are discussed above and any of the devices for forming the croissant dough in a U-shape 10 that are discussed above.

To solve the problems, a method for circularizing croissant dough is, as shown in FIGS. 8-1 to 8-8, the method for circularizing rolled-up croissant dough 5 that is formed in a U-shape by being bent at the center of the length. It comprises a step of carrying the U-shaped croissant dough 5 to a position for circularizing the croissant dough 5 by conveying the croissant dough 5 in a predetermined direction (see FIG. 8-1). It also comprises a step of moving a first end 5*a* of the conveyed croissant dough 5 to the center of the U-shape (see FIG. 8-2). It also comprises a step of lifting a second end 5*b* of the conveyed croissant dough 5 so that the lower face of the second end 5*b* is above the upper face of the first end 5*a*, and moving the second end 5*b* to the center of the U-shape (see FIGS. 8-2 and 8-3). It also comprises a step of vertically pressing and sticking together the first end 5*a* and the second end 5*b* that are moved to the center (see FIG. 8-5). The step of moving the first end 5*a* to the center may be carried out either before or after the step of lifting the second end 5*b*, so that the lower face of the second end 5*b* is above the upper face of the first end 5*a*.

The method for circularizing the croissant dough may, as shown in FIG. 8-2, further comprise a step of enfolding the conveyed croissant dough 5 from both sides of the U-shape.

In the method for circularizing the croissant dough, for example as shown in FIGS. 8-4 and 8-5, at the step of vertically pressing and sticking the first end 5*a* and the second end 5*b* together, walls 114*f*, 116*f* may be used for preventing the first end 5*a* and the second end 5*b* that have been moved to the center from spreading toward the sides of the U-shape.

The method for circularizing the croissant dough may, for example as shown in FIG. 8-10, comprise a step of again vertically pressing, over a width that is greater than the distance between the walls 114*f*, 116*f* at the step of pressing, the first and second ends 7*a*, 7*b* that have been stuck together at the step of sticking.

The method for circularizing the croissant dough may comprise a step of attaching water to a part of the first end 5*a* or a part of the second end 5*b*, wherein one of the parts contacts a face of the other end so that the first end 5*a* sticks to the second end 5*b*.

In the method for circularizing the croissant dough, the length L4 of the legs of the first and second ends 7*a*, 7*b* to be stuck together at the step of sticking may be regulated.

The length L4 of the first and second ends 5a, 5b to be stuck together may be regulated by adjusting a position so that the first end 5a is pressed so that it is moved to the center of the U-shape and a position so that the second end 5b is pressed so that it is also moved to the center of the U-shape.

In the method for circularizing the croissant dough, at the step of sticking the first end 5a and the second end 5b together the time for vertically pressing the first end 5a to the second end 5b may be adjusted or the travel to vertically press the first end 5a and the second end 5b so that the first end 5a and the second end 5b are stuck together may be adjusted, or both may be adjusted.

To solve these problems, a method for forming croissant dough in a U-shape, which croissant dough is used in the method for circularizing the croissant dough of the present invention, for example as shown in FIGS. 1 and 7, comprises a step of conveying the rolled-up croissant dough 3 that is placed so that the longitudinal direction of the croissant dough is perpendicular to the direction for conveyance. It also comprises a step of pushing the center of the length of croissant dough 3 in the direction for conveyance during the step of conveying. It also comprises a step of contacting the croissant dough 3 that is pushed at the step of pushing from both longitudinal ends to form the croissant dough 3 in a U-shape and to transport both legs of the U-shape in the direction for conveyance during the step of conveying (see FIG. 7(a)). It also comprises a step of measuring the lengths L1, L2 of the legs of the U-shape or the distance between the ends of the legs L3 of the U-shaped croissant dough 5 during the step of conveying. In the method for forming croissant dough in a U-shape, based on the lengths L1, L2 of the legs of the U-shape or the distance between the ends of the legs L3 that are measured, the rates for transporting both legs in the direction for conveyance Va, Vb are adjusted during the step of transporting both legs of the U-shape so as to arrange the lengths L1e, L2e of the legs of the U-shape to have the same length.

By the device for circularizing the croissant dough of the present invention, since the device comprises the first guide for reducing the width, the plate, the second guide for reducing the width, and the pusher so as to vertically press and stick together the first end to the second end, the croissant dough can be quickly and stably circularized.

By the device for forming the croissant dough in a U-shape of the present invention, since the device comprises the conveyor, the pair of side belts, the center pin, and the sensor so as to adjust the rates for transporting the croissant dough by each of the side belts so as to arrange the lengths of the legs of the U-shape to have the same length, croissants in the required shape can be produced by quickly and stably arranging the lengths of the legs of the U-shape to have the same length.

By the method for circularizing the croissant dough of the present invention, the method comprises the steps of carrying the croissant dough in a position for circularizing the croissant dough, moving the first end of the conveyed croissant dough to the center, lifting and moving the second end to the center, and vertically pressing and sticking together the first end to the second end that are moved to the center, the croissant dough can be quickly and stably circularized.

By the method for forming the croissant dough in a U-shape of the present invention, since the method comprises the steps of conveying the rolled-up croissant dough that is placed so that the longitudinal direction of the croissant dough is perpendicular to the direction for conveyance, pushing the center of the length of croissant dough in the direction for conveyance, contacting the pushed croissant dough 3 from both longitudinal ends to form the croissant dough in a U-shape and to transport both legs of the U-shape to the direction for conveyance, and measuring the lengths of the legs of the U-shape or the distance between the ends of the legs of the croissant dough so that the rates for transporting both legs in the direction for conveyance are adjusted during the step of transporting both legs of the U-shape so as to arrange the lengths of the legs to have the same length. Thereby, the lengths of the legs of the U-shaped croissant dough can be quickly and stably arranged to have the same length so that croissants in a required shape are produced.

The basic Japanese patent application, No. 2013-208900, filed Oct. 4, 2013, is hereby incorporated by reference in its entirety in the present application.

The present invention will become more fully understood from the detailed description given below. However, the detailed description and the specific embodiments are only illustrations of the desired embodiments of the present invention, and so are given only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present invention in the sense of the doctrine of equivalents.

The use of the articles "a," "an," and "the" and similar referents in the specification and claims are to be construed to cover both the singular and the plural, unless otherwise indicated herein or clearly contradicted by the context. The use of any and all examples, or exemplary language (e.g., "such as") provided herein is intended merely to better illuminate the invention, and so does not limit the scope of the invention, unless otherwise stated.

BRIEF DESCRIPTION OF DRAWINGS

FIG. 7(a) shows that a sensor measures the lengths of the legs. FIG. 7(b) shows that the side belts arrange the legs to have the same length.

FIG. 8-1 illustrates how the device for circularizing the croissant dough circularizes the croissant dough. It shows that the croissant dough is carried to the device for circularizing the croissant dough. (a) is a plan view and (b) is a side view taken from the upstream side.

FIG. 8-2 illustrates how the device for circularizing the croissant dough circularizes the croissant dough. It shows that the croissant dough is enfolded by holders and the first end is moved toward the center by the first guide. (a) is a plan view and (b) is a side view taken from the upstream side.

FIG. 8-3 illustrates how the device for circularizing the croissant dough circularizes the croissant dough. It shows that the first end is lifted by the plate and moved toward the center by the second guide for reducing the width. (a) is a plan view and (b) is a side view taken from the upstream side.

FIG. 8-4 illustrates how the device for circularizing the croissant dough circularizes the croissant dough. It shows that the first end and the second end overlap and the plate and the second guide for reducing the width are lowered. (a) is a plan view and (b) is a side view taken from the upstream side.

FIG. 8-5 illustrates how the device for circularizing the croissant dough circularizes the croissant dough. It shows that the pusher vertically presses the first and second ends so as to have them stick together. (a) is a plan view and (b) is a side view taken from the upstream side.

FIG. 8-6 illustrates how the device for circularizing the croissant dough circularizes the croissant dough. It shows that, after having the first and second ends stick together, the pusher upward moves while blowing air through the hole for blowing air. (a) is a plan view and (b) is a side view taken from the upstream side.

FIG. 8-7 illustrates how the device for circularizing the croissant dough circularizes the croissant dough. It shows that, after having the first and second ends stick together, the first guide for reducing the width, the second guide for reducing the width, and the holders all retract in the direction for being separated from the croissant dough. (a) is a plan view and (b) is a side view taken from the upstream side.

FIG. 8-8 illustrates how the device for circularizing the croissant dough circularizes the croissant dough. It shows that the croissant dough is conveyed to the second pusher. (a) is a plan view and (b) is a side view taken from the upstream side.

FIG. 8-9 illustrates how the device for circularizing the croissant dough circularizes the croissant dough. It shows that the second holders enfold the croissant dough. (a) is a plan view and (b) is a side view taken from the upstream side.

FIG. 8-10 illustrates how the device for circularizing the croissant dough circularizes the croissant dough. It shows that the second pusher presses the first and second ends that have been stuck together. (a) is a plan view and (b) is a side view taken from the upstream side.

FIG. 8-11 illustrates how the device for circularizing the croissant dough circularizes the croissant dough. It shows that, after pressing the first and second ends, the second pusher upward moves while blowing air through the hole for blowing air. (a) is a plan view and (b) is a side view taken from the upstream side.

FIG. 8-12 illustrates how the device for circularizing the croissant dough circularizes the croissant dough. It shows that the second holders retract in the direction for being separated from the croissant dough. (a) is a plan view and (b) is a side view taken from the upstream side.

DETAILED DESCRIPTION OF THE PREFERRED EMBODIMENTS

Below, with reference to the drawings an embodiment of the present invention is discussed. In the figures, identical or similar elements are designated with the same symbols, and duplicate explanations are omitted.

Figure 1:
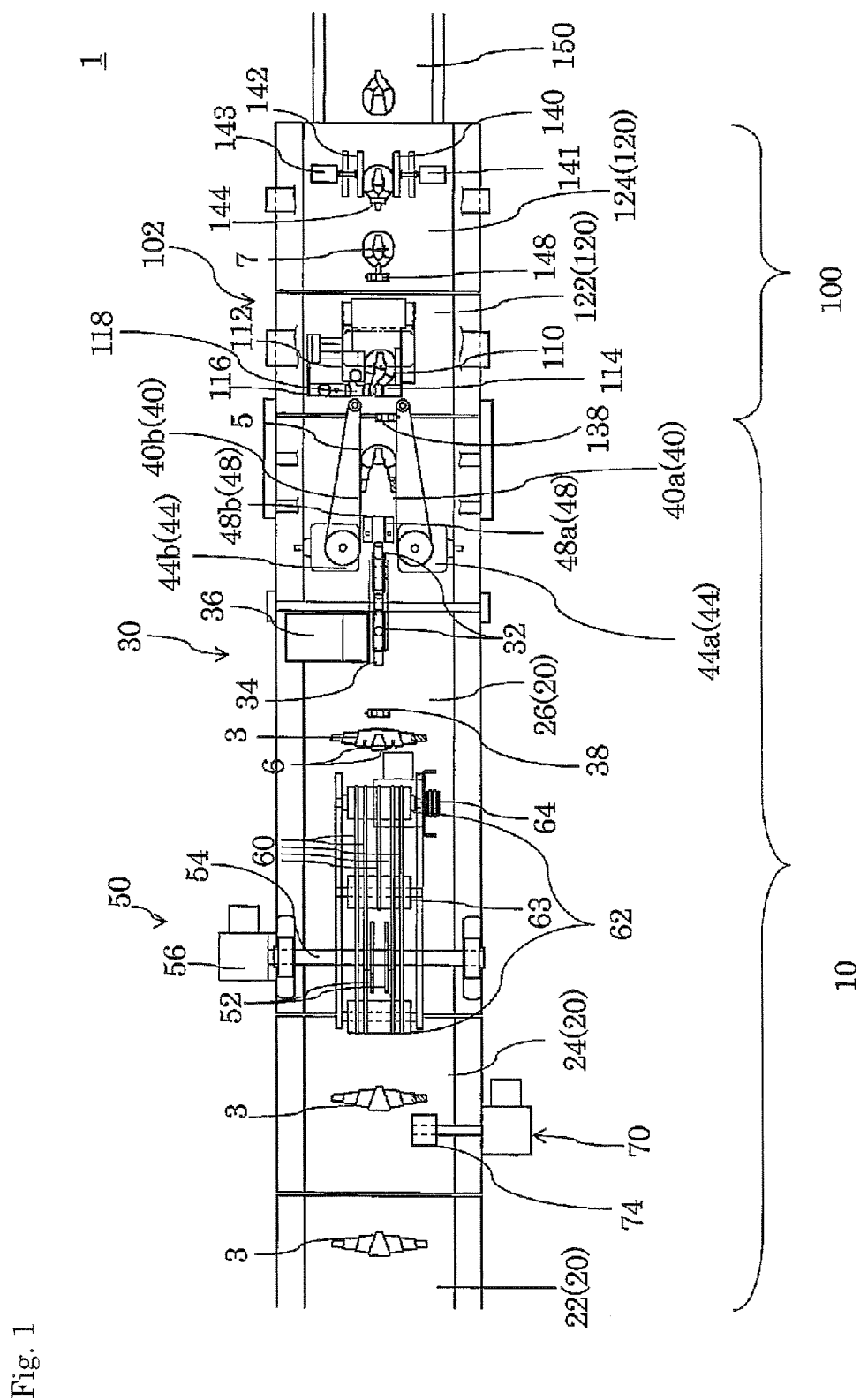
FIG. 1 is a full plan view of a device for forming croissant dough in a U-shape and a device for circularizing the croissant dough.

First, the device for forming the croissant dough in a U-shape 10 is discussed with reference to FIG. 1, which is a full plan view of a device for forming croissant dough in a U-shape 10 and a device for circularizing the croissant dough 100, and FIG. 2, which is a front view of them.

Croissant dough 3 that has been manufactured by a device for producing croissant dough (not shown) and rolled up by a device for rolling dough (not shown) is shaped as a bar that has a thick center. It is placed on a conveyor 22 so that its longitudinal axis is perpendicular to the direction for conveyance, i.e., its longitudinal axis is vertical in FIG. 1. The croissant dough 3 is conveyed, by the conveyor 22, from the left in the figure. That is, the left is the upstream side and the right is the downstream side. A conveyor 24 is provided at the downstream side, adjacent to the conveyor 22. A conveyor 26 is provided at the downstream side, adjacent to the conveyor 24. These conveyors 22, 24, 26 collectively are called a conveyor 20. The conveyor 20 is not necessarily composed of three conveyors 22, 24, 26. The number of conveyors is arbitrarily determined based on the distance to convey the croissant dough, and so on. Thus, in the following discussion, references to the conveyor 22, 24, or 26 are nothing more than a discussion on an embodiment and do not limit the scope of the invention.

A water feeder 70, which attaches water to a part of the ends, which ends are to be stuck together to circularize the croissant dough, is provided to the conveyor 24. The water feeder 70 comprises a nozzle 72 that extends downward and a cylindrical sponge 74 at the lower side of the tip of the nozzle 72, which sponge is rotatably supported by a horizontal shaft. The configuration of the water feeder 70 is not limited to that discussed above. It may be a publicly-known one that can attach water to the end of the croissant dough 3. For example, a brush may be used instead of the sponge. It may drop water from a nozzle, without a sponge, to directly attach it to the croissant dough. Here, the water is not limited to natural water, but may be paste for food such as starch paste or a liquid that is suitable to stick the parts of the croissant dough together. A position to provide the water feeder 70 may be in the downstream side of a device for grooving to facilitate bending the croissant dough 50 (a device for grooving 50), which is discussed below. The water feeder 70 may be positioned at any place where it can attach water to the end of the croissant dough before the croissant dough is circularized.

In the upstream portion of the conveyor 26 the device for grooving 50 is provided. It facilitates bending the croissant dough by making grooves 6 in the thick portion of the croissant dough 3 that is rolled up so as to be shaped like a bar that has a thick center. The device for grooving 50 comprises two blades 52, a shaft 54 and a motor for grooving to facilitate bending the croissant dough 56 (a motor for grooving 56). The blades 52 make the grooves 6 from above in the thick portion of the croissant dough 3 that has been rolled up and is conveyed on the conveyor 26. The shaft 54 supports, and rotates, the blades 52. The motor for grooving 56 rotates the shaft 54. The number of grooves made in the croissant dough 3, i.e., the number of blades 52, may be arbitrarily determined based on the size, thickness or Elasticity of the croissant dough 3. Depending on the croissant dough 3, no device for grooving 50 may be provided.

The device for grooving 50 comprises a belt for pressing the croissant dough down and rolling the croissant dough 60 that presses the croissant dough 3 down if the croissant dough 3 is lifted by the blades 52 when it adheres to the blades 52 while being grooved by the blades 52. The belt 60 also rolls the croissant dough 3, in which the grooves 6 are made so that the grooves face upward to facilitate bending the croissant dough 3 to be in a U-shape. The belt 60 is an endless belt made of a flexible material such as rubber. A plurality of belts 60 are rotated between a plurality of rollers 62. At the lower portion, i.e., the side to contact the croissant dough 3, the belt 60 moves in the downstream direction more slowly than the conveyor 26 does or in the direction opposite to the direction that the conveyor 26 moves. When the croissant dough 3 is grooved by the blades 52 the belt 60 presses the croissant dough 3 down so as to separate it from the blades 52 if the croissant dough 3 is lifted by the blades 52 when it adheres to the blades 52 while being grooved by the blades 52. The lower portion of the belt 60 is lowered by a middle roller 63. When the croissant dough 3 moves to the downstream side of the blades 52 the belt 60 contacts the croissant dough 3. Because of the difference in the speeds for transporting the croissant dough 3 by the belt 60 and the conveyor 26, the croissant dough 3 is rolled. The rotation of the belt 60 as an endless belt is carried out by rotating one roller 62 or multiple rollers 62 by a driver for the belt 64. By the embodiment in FIG. 1 the grooved croissant dough 3 is pressed down by four belts 60. In the downstream side it is rolled by five belts 60. However, the number of belts 60 is arbitrarily determined.

A sensor for detecting the croissant dough 38 is provided above the conveyor 26 in the downstream side of the device for grooving 50. The sensor 38 detects the croissant dough 3 that is conveyed on the conveyor 26 so as to determine the timing of the operation of a device for a center pin 30 that is provided in the downstream side of the sensor 38. The sensor 38 is a sensor of any type that can detect the croissant dough 3. It may be of contact type or non-contact type. For example, a microswitch or an optoelectronic sensor may be used for it. The position where the sensor 38 is located is not necessarily above the conveyor 26. It may be at the side of the conveyor 26 or at another conveyor.

The device for a center pin 30 and side belts 40 are provided in the downstream side of the sensor 38 on the conveyor 26. The device for a center pin 30 pushes, by a center pin 32, the center of the croissant dough 3 that is shaped as a bar and conveyed on the conveyor 26 so as to feed the croissant dough 3 to the side belts 40. The device 30 comprises a belt for the center pin 34, which belt rotates between at least two rollers. It also comprises one or multiple center pins 32 that are fixed to the belt 34. The center pin 32 is located at the center of the width of the conveyor 26 so as to push the center of the length of the croissant dough 3 that is conveyed. When the rollers rotate, the center pin 32 moves in the downstream direction above the conveyor 26 at the same speed, or a slightly faster speed, than that of the conveyor 26, and returns to the upstream position. In the embodiment of FIGS. 1 and 2 the belt 34 rotates among three rollers. However, the number of rollers is arbitrarily determined, and may be two, or more. In this embodiment the roller in the upstream end is driven by a motor for the center pin 36 so that the motor 36 is located above the highest part of the croissant dough 3. The operation of the motor 36 is controlled by a signal for detection from the sensor 38. Thus the motor 36 is timely activated so that the center pin 32 pushes the croissant dough 3. The member that moves along the center line of the conveyor in the direction for conveyance of Publication 3 may be used for the center pin 32.

The side belts 40 are located in the downstream side of the device 30. The side belts 40 are a pair of belts 40a, 40b that horizontally face one another. Each of the side belts 40a, 40b is supported by two pulleys so that the faces that face one another are parallel or so that the space between them becomes narrower in the downstream side. Each of the side belts 40a, 40b rotates between the two pulleys by the rotation of the pulley that is driven by one of the motors for the side belts 44a, 44b (44). The pair of side belts 40 enfold the croissant dough 3, from two sides. It is pushed and fed by the center pin 32 so as to form the croissant dough 3 in a U-shape that opens in the upstream direction. They also transport it in the downstream direction. The upstream ends of the pair of side belts 40 are located at, or near, the ends of the croissant dough 3 that is pushed and fed by the center pin 32. That is, the croissant dough 3 that is pushed and fed by the center pin 32 contacts the pair of side belts 40 at their ends. It is bent so that the place that is pushed by the center pin 32 is the center. Thus it is formed in a U-shape. Then the pair of side belts 40 contact the legs (the vertical lines of the U) of croissant dough 5 that is formed in a U-shape to transport the croissant dough 5 in the direction for conveyance. The space between the pair of side belts 40a and 40b that face one another can be adjusted.

Above each of the side belts 40 sensors 48 are provided to measure the lengths of the legs of the U-shaped croissant dough 5. The sensors 48 for measuring the lengths of the legs may be a contact type or a non-contact type. For example, a microswitch or an optoelectronic sensor may be used for them. Instead of the sensors 48 for measuring the lengths of the legs sensors may measure the distance between the positions of the tips of the legs. The distance between the positions of the tips of the legs is the distance between the positions of the tips of the legs in the direction for conveyance at any instant of time. It may be measured as the difference between the times when the tips of the croissant dough 5 that is being conveyed pass a line that is perpendicular to the direction for conveyance. The positions where the sensors 48 are provided are not necessarily above the side belts 40. They may be at the sides of the side belts 40 or other positions.

Based on the data measured by the sensors 48 for detecting the lengths of the legs or alternate sensors, a controller (not shown) of the device for forming the croissant dough in a U-shape 10, for example, calculates how to move the legs to arrange the lengths L1, L2 (see FIG. 7) of the legs to have the same length. Based on the result of the calculation the rates Va, Vb for transporting the legs of the croissant dough 5 by the side belts 40a, 40b are adjusted so as to arrange the lengths L1e, L2e (see FIG. 7) of the legs to have the same length. The contacting condition between the side belts 40 and the croissant dough 5 is less slippery than the contacting condition between the conveyor 26 and the croissant dough 5. Thus even though the conveyor 26 conveys the croissant dough 5 at a constant rate V, the rates for transporting the legs of the croissant dough 5 in a U-shape are changed by changing the rates Va, Vb for rotating the side belts 40. Thus the lengths L1, L2 of the legs can be changed so as to arrange the lengths L1e, L2e of the legs to have the same length. To contact the side belts 40 with the croissant dough 5 at the condition that is less slippery, for example, the side belts 40 may be formed of soft rubber. The faces of the side belts 40 that contact the croissant dough 5 may be rough. Alternatively, the pressure to contact the side belts 40 with the legs of the croissant dough 5 may be high. The device for forming the croissant dough in a U-shape 10 includes the devices 20, 30, 40, 50, and 70.

Next, the device for circularizing the croissant dough 100 is discussed. A conveyor 122 is provided at the downstream side, adjacent to the conveyor 26. A conveyor 124 is provided at the downstream side, adjacent to the conveyor 122. These conveyors 122, 124 are collectively called a conveyor 120. The conveyor 120 is not necessarily composed of two conveyors 122, 124. The number of conveyors is arbitrarily determined based on the distance to convey the croissant dough and so on. Thus, in the following discussion, the references to the conveyor 122 or 124 are nothing more than a discussion on an embodiment, and do not limit the scope of the invention.

A second sensor for detecting the croissant dough 138 is provided above the upstream portion of the conveyor 122. The second sensor 138 detects the croissant dough 5 that is conveyed on the conveyor 122 so as to stop the croissant dough 5 at the working positions for a first guide for reducing the width 114, a second guide for reducing the width 116, a plate 118, a pusher 130, and so on, that are located in the downstream side of the second sensor 138. The second sensor 138 is also used for determining the timing for actuating these members. The second sensor 138 is a sensor of any type that can detect the croissant dough 5. It may be a contact type or a non-contact type. For example, a microswitch or an optoelectronic sensor may be used for it. The position where the second sensor 138 is located is not necessarily above the conveyor 122. It may be at the side of the conveyor 122 or another conveyor.

Holders (first holders) 110, 112, the first guide for reducing the width 114, the second guide for reducing the width 116, the plate 118, and the pusher (a first pusher) 130, are provided on the conveyor 122 in the downstream side of the second sensor 138. These members are collectively called a principal part of the device for circularizing the croissant dough 102. The principal part 102 circularizes the U-shaped croissant dough 5.

Based on the signal for detection by the second sensor 138 the croissant dough 5 that is conveyed by the conveyor 122 is controlled to stop at the working positions for the principal part 102. The working positions for the principal part 102 mean the positions where the principal part 102 circularizes the croissant dough 5, which principal part is discussed below. The positions to stop the croissant dough 5 can be precisely adjusted within the working positions for the principal part 102. That is, after the second sensor 138 detects the croissant dough 5, the distance to convey the croissant dough 5 before the conveyor 122 stops (namely, if the conveyor conveys at a constant rate, the time from detecting the croissant dough to stopping the conveyor) can be adjusted.

Now, further with reference to FIGS. 3 to 6, the configuration of the principal part 102 is discussed. The holders 110, 112 enfold, from the sides, the legs of the U-shaped croissant dough 5 that is conveyed on the conveyor 122. The faces of the holders 110, 112 that contact the croissant dough 5 are generally flat. However, they may curve in a horizontal plane. These faces are made of a material, such as metal and plastic, that does not deform nor adhere to the croissant dough 5 when enfolding it. The holders 110, 112 are driven by a driver 104 to come close to, and separate from, one another. The movements of the holders 110, 112 may be synchronous or non-synchronous. When the holders 110, 112 come close to one another, they enfold the legs of the croissant dough 5 from the sides.

Figure 2:
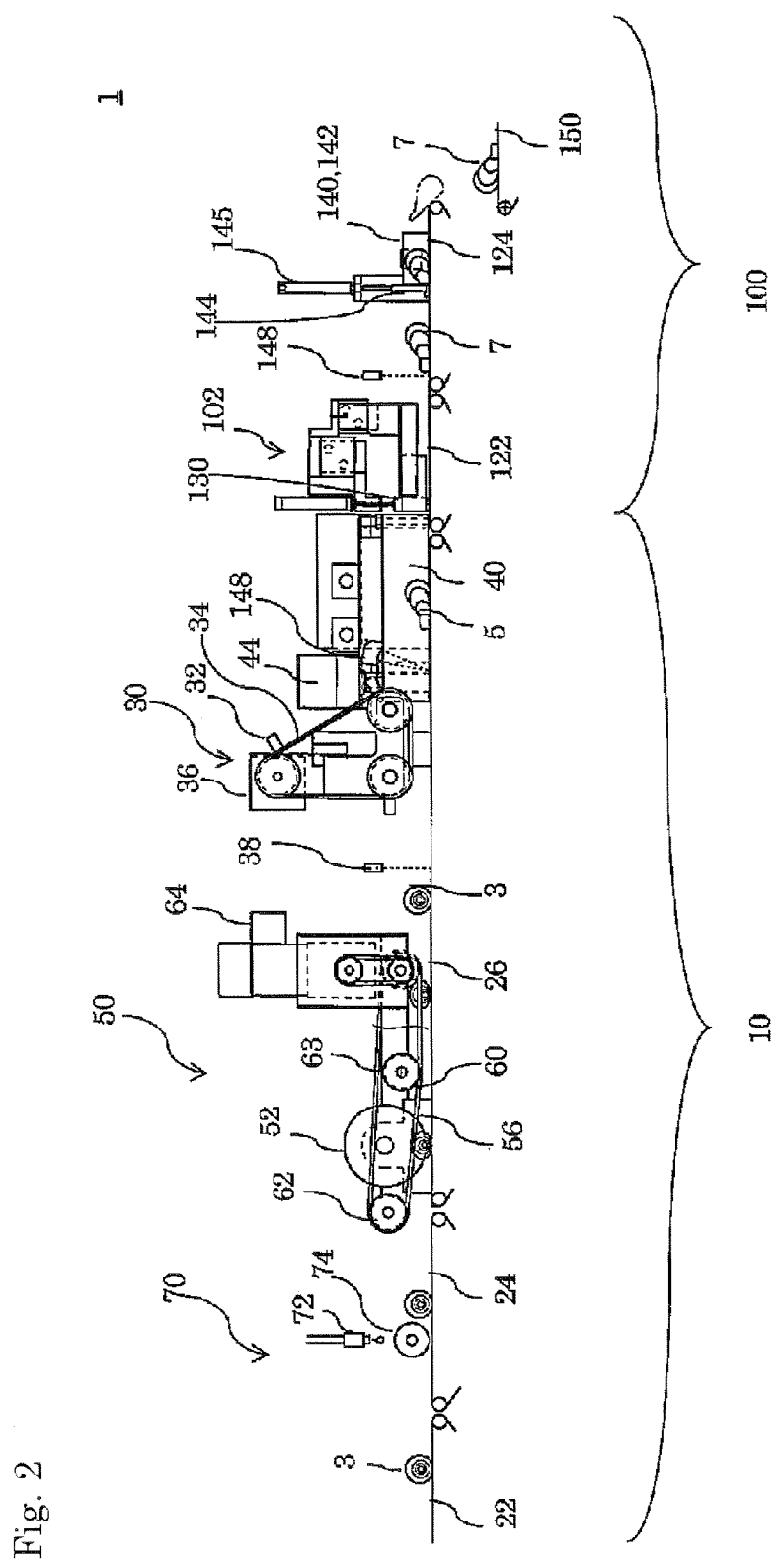
FIG. 2 is a full front view of the device for forming the croissant dough in a U-shape and the device for circularizing the croissant dough of FIG. 1.
Figure 8:
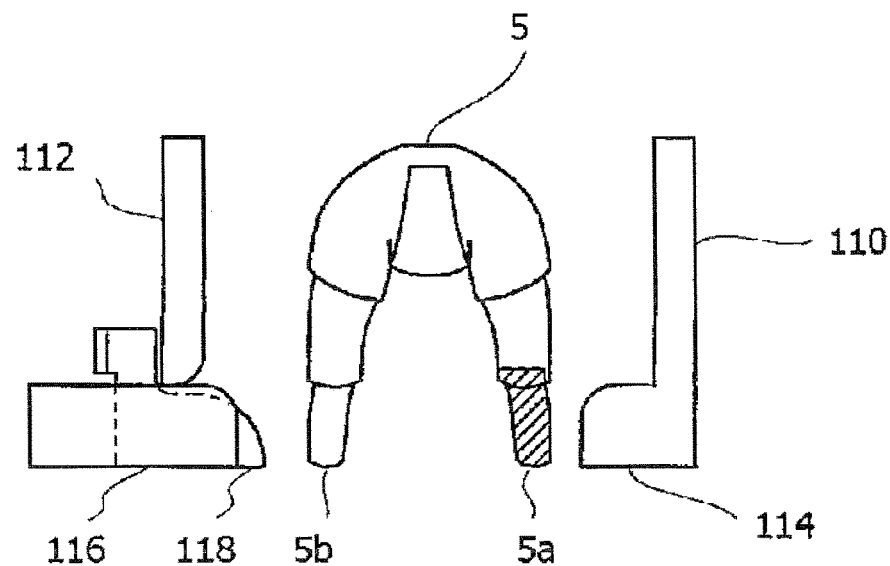
Figure 1:
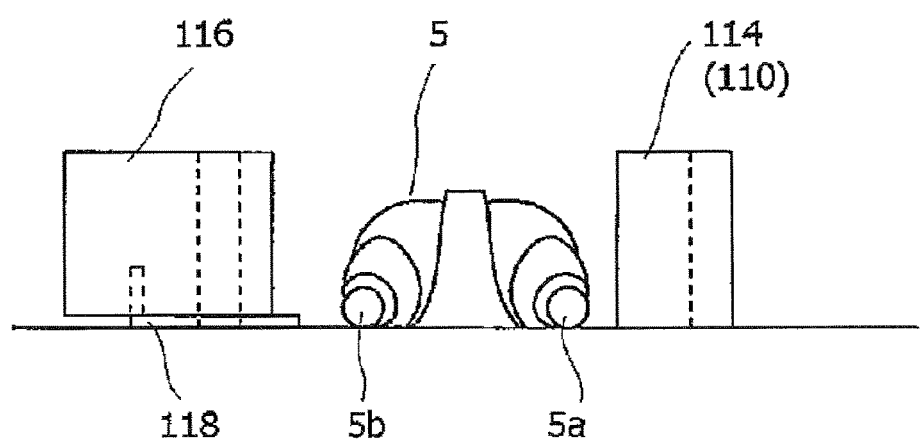
Figure 8:
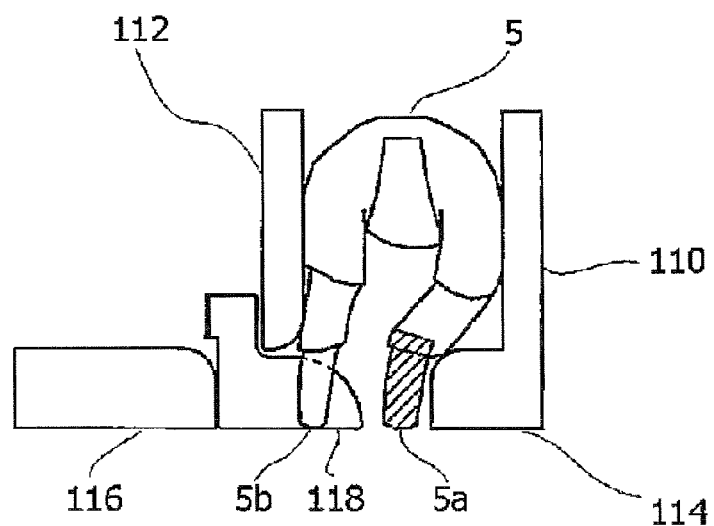
Figure 2:
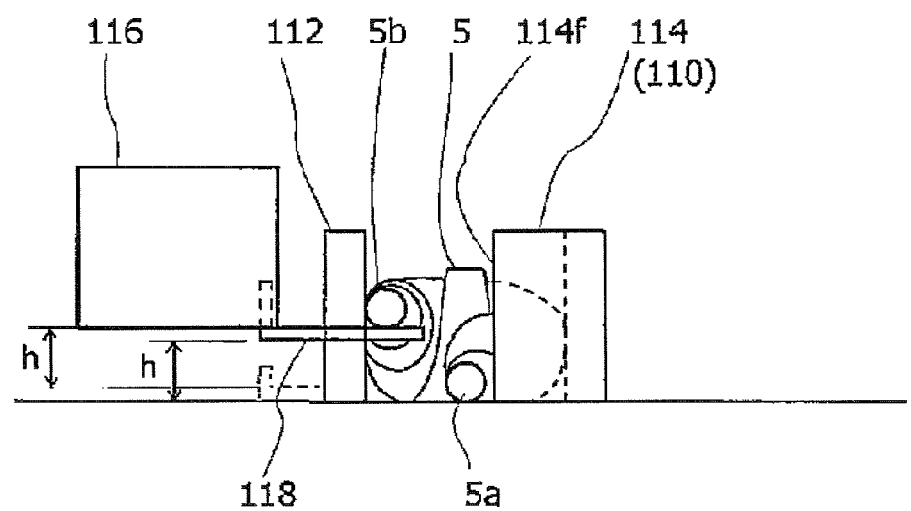
Figure 8:
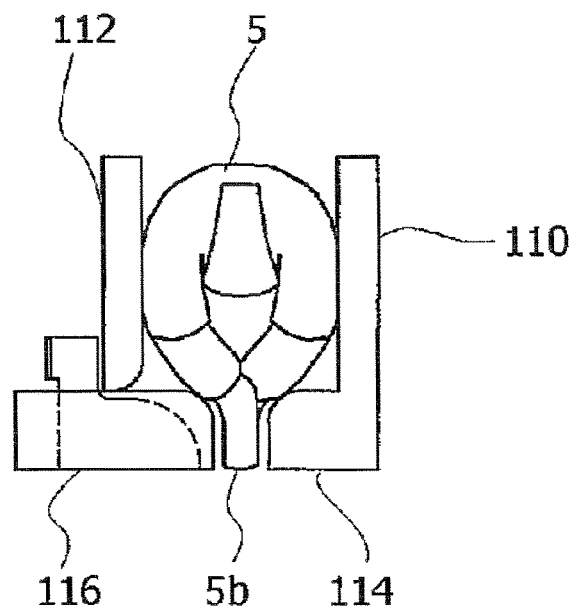
Figure 3:
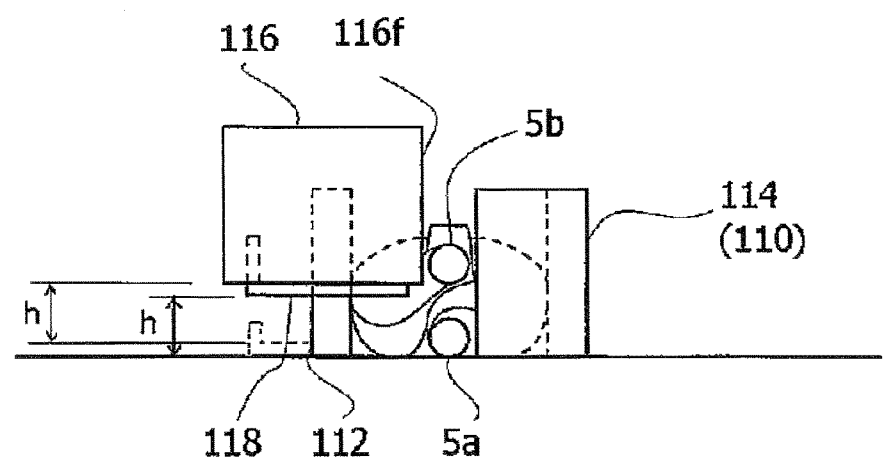
Figure 8:
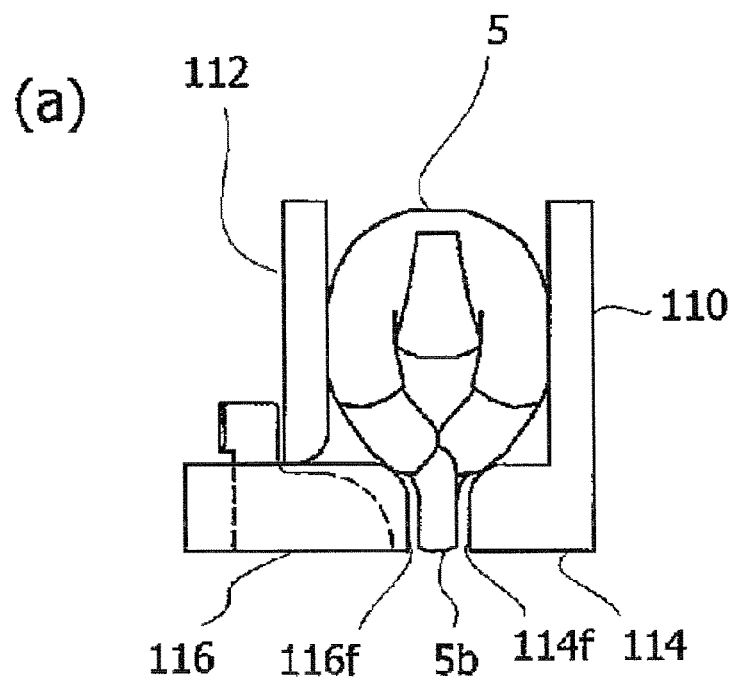
Figure 4:
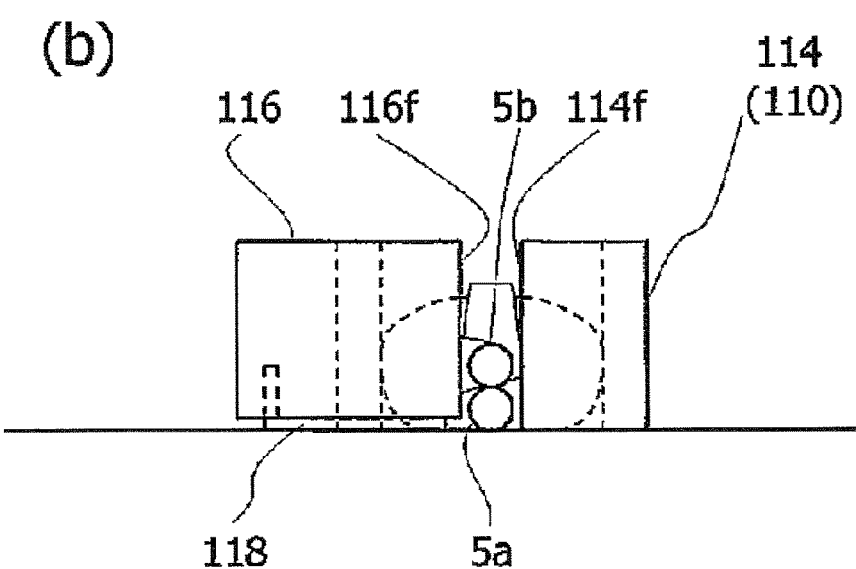
Figure 8:
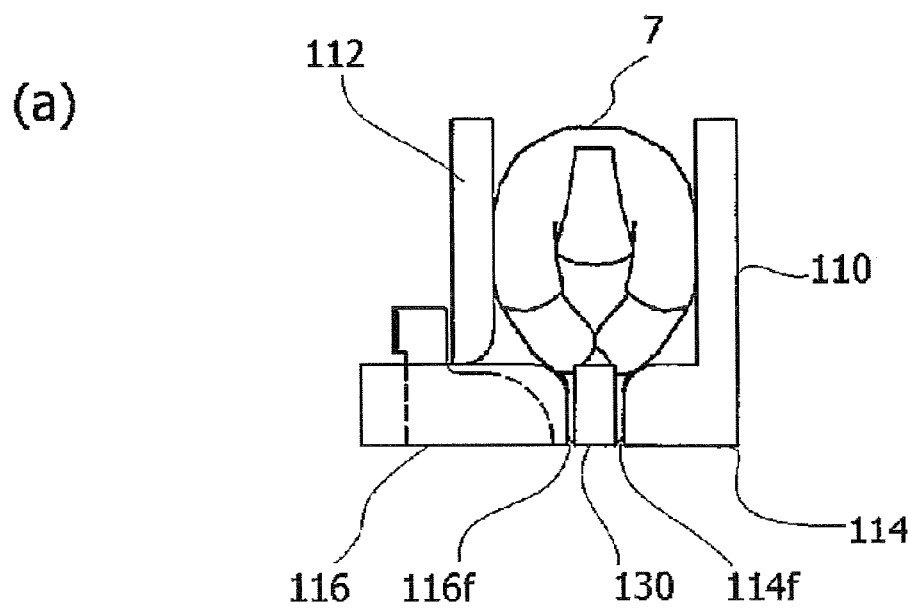
Figure 5:
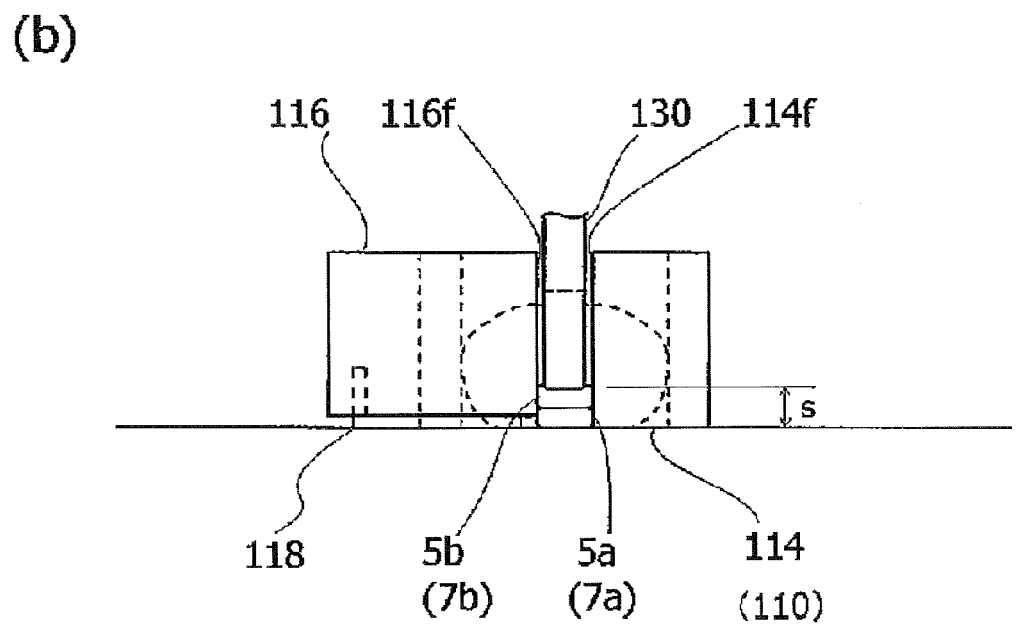
Figure 8:
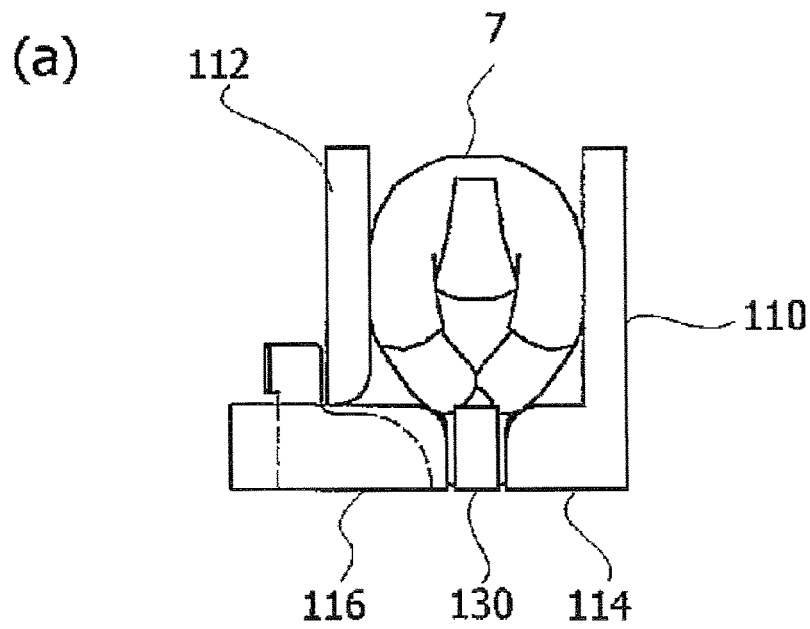
Figure 6:
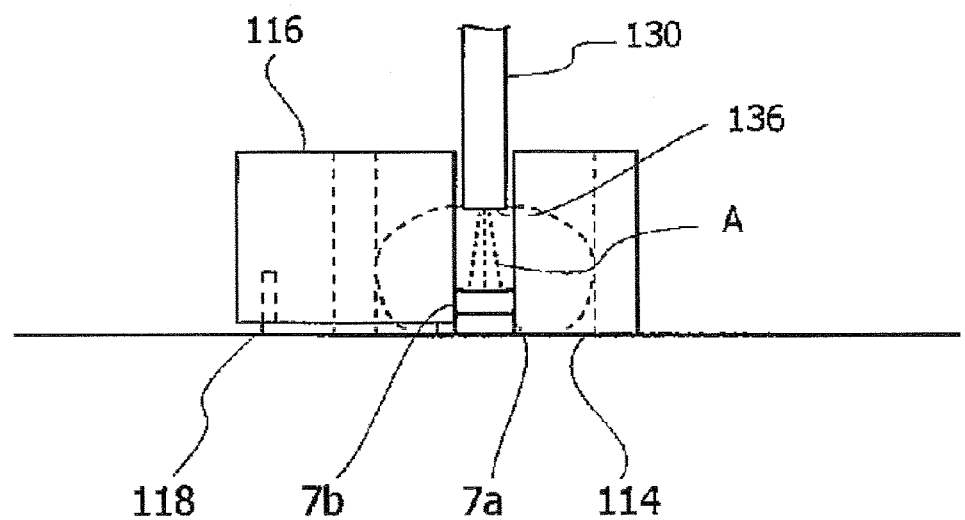
Figure 8:
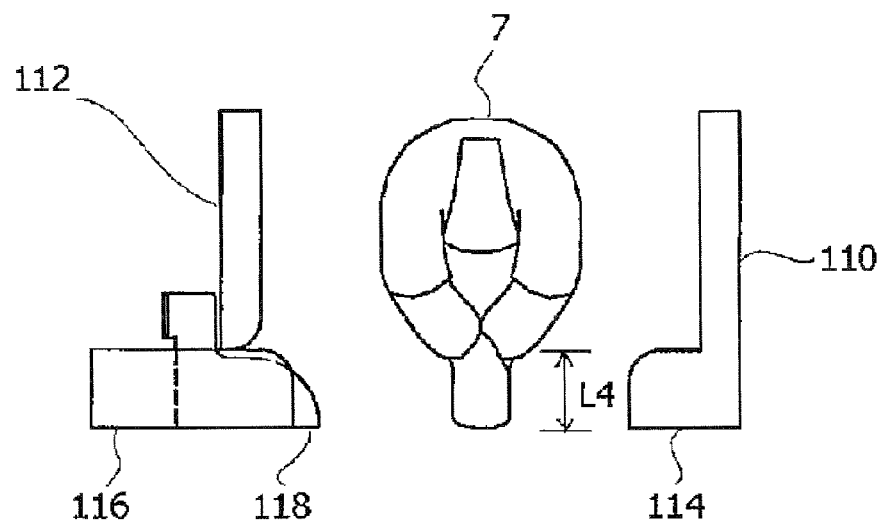
Figure 7:
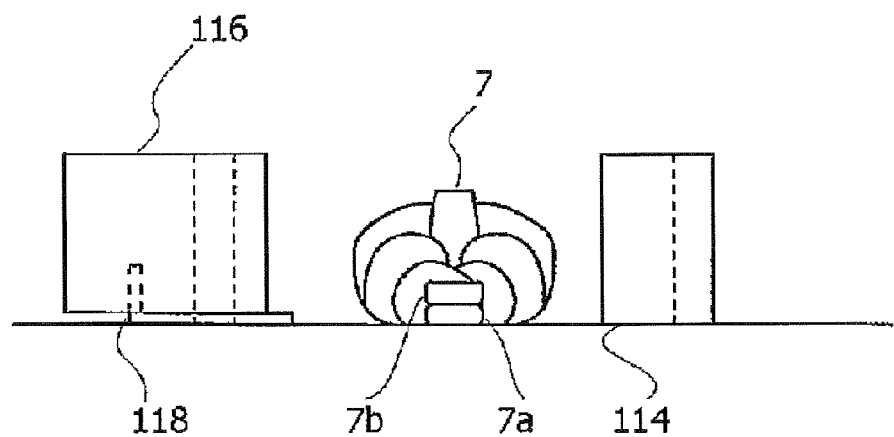
Figure 8:
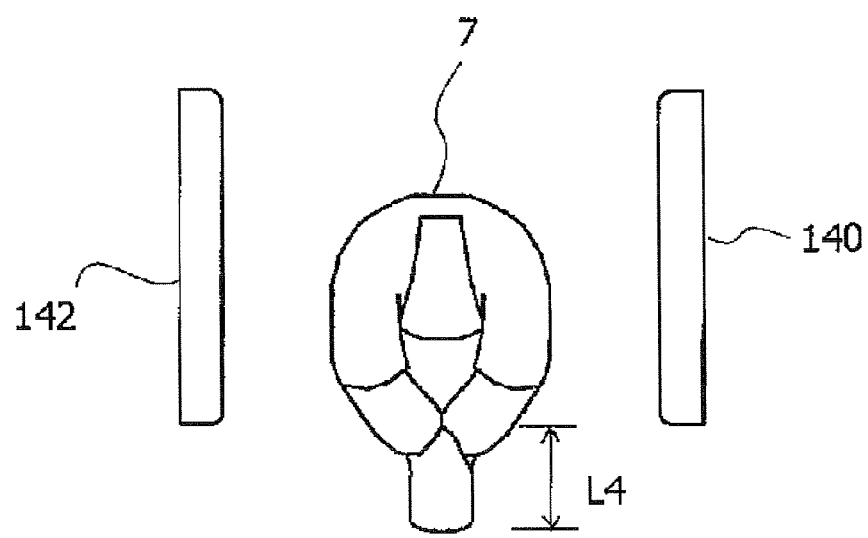
Figure 8:
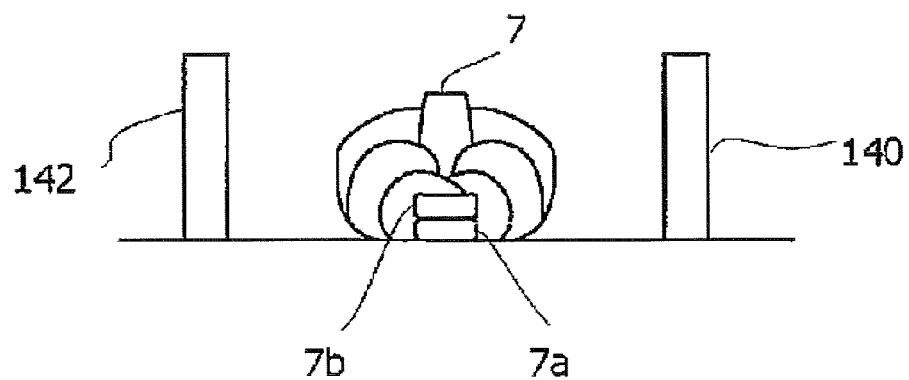
Figure 8:
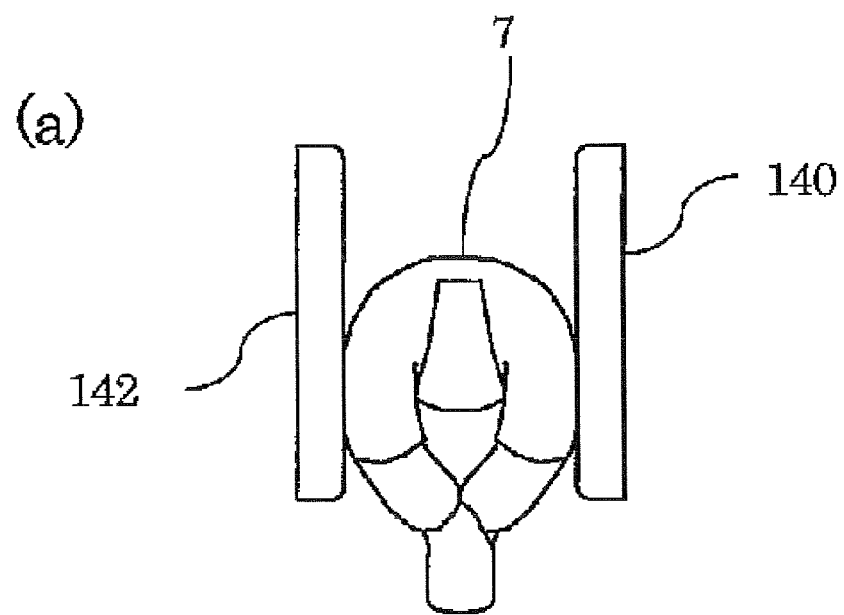

The first guide for reducing the width 114 moves the end 5a of one leg of the U-shaped croissant dough 5 to the center of the U-shape, the first guide linearly moving toward, and retracting from, the center (see FIG. 8-2). The face 114f of the first guide 114 that moves the first end 5a is preferably rounded in a horizontal plane in the downstream portion, i.e., a portion near the thick center of the croissant dough 5 (the upper part in FIG. 3). That is because the legs tend to spread out toward the downstream side when the end 5a is moved to the center. The other parts of the face 114f may be flat or curved in a horizontal plane. The first guide 114 is moved by the driver 104 between the position to move the end 5a to the center of the U-shape and the position to retract from the end 5a. The position to retract from the end 5a means the position where the croissant dough 5 does not touch the first guide 114 when it passes through it. The face of the first guide 114 that contacts the end 5a is made of a material, such as metal and plastic, that does not deform nor adhere to the croissant dough 5 when moving the end 5a. The first guide 114 may be integrated with the holder 110. If the first guide 114 and the holder 110 are integrated, the number of members decreases. Further, one driver 104 can move both of them. Thus the device becomes economical and its reliability is improved.

The second guide for reducing the width 116 is located to face the first guide 114. It moves the other end 5b of the U-shaped croissant dough 5 to the center of the U-shape, the second guide linearly moving toward, and retracting from, the center (see FIG. 8-3). The shape and material of the second guide 116 are the same as, or similar to, those of the first guide 114. The second guide 116 is vertically moved by a driver 105 to follow the vertical movement of the plate 118, which is discussed below. It is moved by a driver 106 between the position to move the end 5b to the center of the U-shape and the position to retract from the end 5b on the plate 118. Holes for blowing air may be formed in the faces of the first guide 114 and the second guide 116 that contact the croissant dough to blow air that is supplied from a source of air (not shown).

The plate 118 is inserted between the second guide 116 and the conveyor 122 to lift the second end 5b. The plate 118 is connected to the driver 104 and is horizontally reciprocated with the holder 112. Further, it is vertically moved by a driver 107. It is typically made of a metal plate. It is made of a material that has stiffness so as not to bend when the plate 118 lifts the second end 5b and that does not adhere to the croissant dough 5. When the U-shaped croissant dough 5 is carried to the principal part 102, i.e., the position to circularize the croissant dough, the plate 118 is moved by the driver 104 toward the center of the conveyor 122 to slip under the second end 5b. After moving to the center to have the second end 5b be mounted on it, the plate 118 is moved upward by the driver 107 to lift the second end 5b. It moves to the height so that the lower face of the second end 5b is higher than the upper face of the first end 5a. After the second end 5b is moved to the center of the U-shape by the second guide 116, the plate 118 returns to the original height, i.e., just on the conveyor 122. Thereafter the plate 118 retracts from the center.

Figure 5:
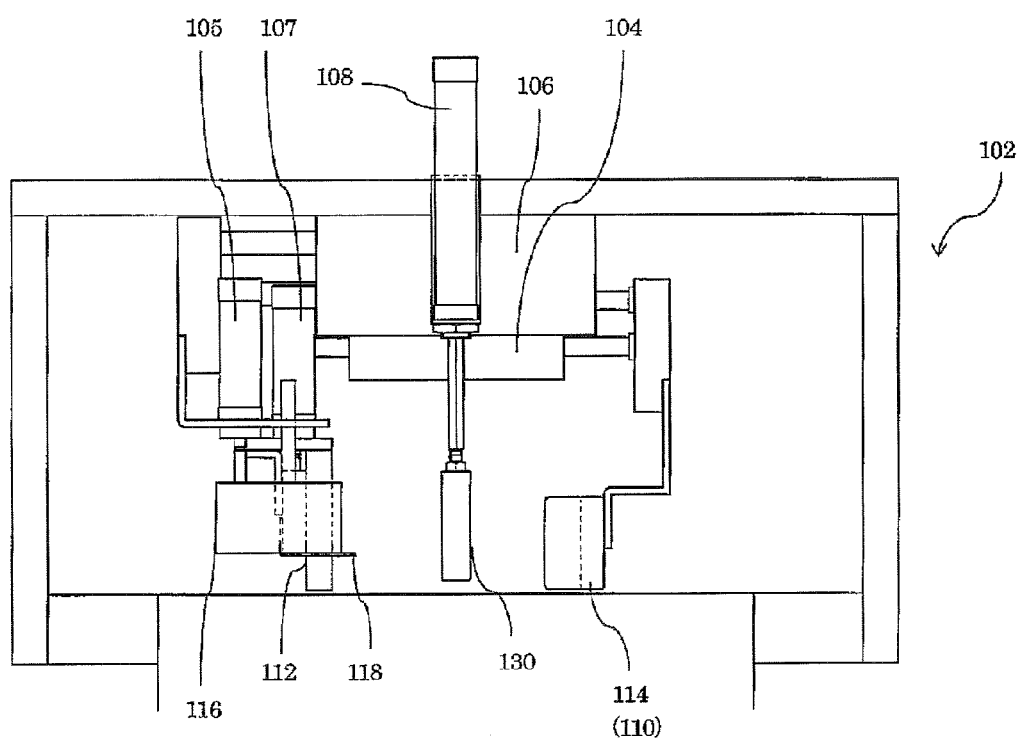
FIG. 5 is a side view of the principal portion of the device for circularizing the croissant dough of FIG. 3, which side view is taken from the upstream side.

The pusher 130 is vertically moved by a driver 108 so as to press the first end 5a and the second end 5b, which are moved to the center so that they stick together (see FIG. 8-5). The pusher 130 vertically moves between the walls that consist of the face 114f of the first guide 114 and the face 116f of the second guide 116 (see FIG. 8-5). The first guide 114 is at the position to move the first end 5a to the center of the U-shape. The second guide 116 is at the position to move the second end 5b to the center of the U-shape. The gaps between the pusher 130 and the walls 114f, 116f are preferably as small as possible unless trouble is caused in moving the pusher 130 vertically. The pusher 130 has a face for pressing the first end 5a and the second end 5b. That face is typically flat, but may be curved. The shape of that face is arbitrary. It is shown as a rectangle by an example. The pusher 130 is, for example, longer in the direction for conveying the croissant dough than the width in the direction perpendicular to the direction for conveyance. The pusher 130 is typically made of metal or plastic. It is made of a material that does not deform nor adhere to the croissant dough 5 when pressing the first end 5a and the second end 5b. A hole for blowing air 136 is formed in the face for pressing the first end 5a and the second end 5b (see FIG. 8-6) to blow air that is supplied from a source of air (not shown). An elastic material such as a spring may be positioned between the pusher 130 and the driver 108 so that a pressing force is applied to the croissant dough. If the driver 108 is an air cylinder, the pressure to supply air may be adjusted to regulate the degree (strength) to cause the first end 5a and the second end 5b to be stuck together.

For the pusher 130 the time for pressing the first end 5a and the second end 5b and the travel to move downward to press them (i.e., the height s from the face for conveyance of the conveyor 122 when the pusher 130 is lowered [see FIG. 8-5]) are adjustable. Either the time or the travel may be adjustable. By adjusting the time for the pusher 130 to press the first end 5a and the second end 5b or the travel for the pusher 130 to move downward to press them, or both, the degree (strength) to cause the first end 5a and the second end 5b to be stuck together can be regulated.

Further, since the positions to stop the croissant dough 5 within the working positions for the principal part 102 can be precisely adjusted, the position for the first guide 114 to press the first end 5a to move it to the center of the U-shape and the position for the second guide 116 to press the second end 5b to move it to the center of the U-shape are regulated. Thus the length L4 of an overlapped portion of the first end 5a and the second end 5b is regulated. The position for the pusher 130 to press them is also regulated. Since the length L4 of the overlapped portion of the first end 5a and the second end 5b and the position for the pusher 130 to press them are regulated and the degree (strength) to cause them to be stuck together is also regulated, the shape of the croissants after baking can be regulated, to thereby produce the croissants in a desired shape.

Next, a second pusher 144 that is provided on the conveyor 124 and structures that relate to the second pusher 144 are discussed. A third sensor for detecting the croissant dough 148 is provided above the upstream portion of the conveyor 124. The third sensor 148 detects the croissant dough 7 that is conveyed on the conveyor 124 so as to stop the croissant dough 7 at the working positions for second holders 140, 142, a second pusher 144, and so on, that are located in the downstream side of the third sensor 148. The third sensor 148 is also used for determining the timing for actuating these members. The third sensor 148 is a sensor of any type that can detect the croissant dough 7. It may be a contact type or a non-contact type. For example, a microswitch or an optoelectronic sensor may be used for it. The position where the third sensor 148 is located is not necessarily above the conveyor 124. It may be at the side of the conveyor 124 or at another conveyor.

The second holders 140, 142 and the second pusher 144 are provided on the conveyor 124 in the downstream side of the third sensor 148. The second holders 140, 142 enfold from the sides the circularized croissant dough 7 that is conveyed on the conveyor 124 (see FIG. 8-9). The shapes and material of the second holders 140, 142 are the same as, or similar to, those of the holders 110, 112. The second holders 140, 142 are moved by drivers 141, 143 to come close to, and separate from, one another. The movements of the second holders 140, 142 may be synchronous or non-synchronous. When the second holders 140, 142 come close to one another, they enfold the circularized croissant dough 7 from the sides.

Based on the signal for detection generated by the third sensor 148 the croissant dough 7 that is conveyed by the conveyor 124 is controlled to stop at the working positions for the second holders 140, 142 and the second pusher 144. The working positions for the second holders 140, 142 and the second pusher 144 mean the positions where the croissant dough 7 is processed by the second holders 140, 142 and the second pusher 144. The positions to stop the croissant dough 7 can be precisely adjusted within the working positions for the second holders 140, 142 and the second pusher 144. That is, after the third sensor 148 detects the croissant dough 7, the distance to convey the croissant dough 7 before the conveyor 124 stops (if the conveyor conveys at a constant rate, the time from detecting the croissant dough to stopping the conveyor) can be adjusted.

Figure 9:
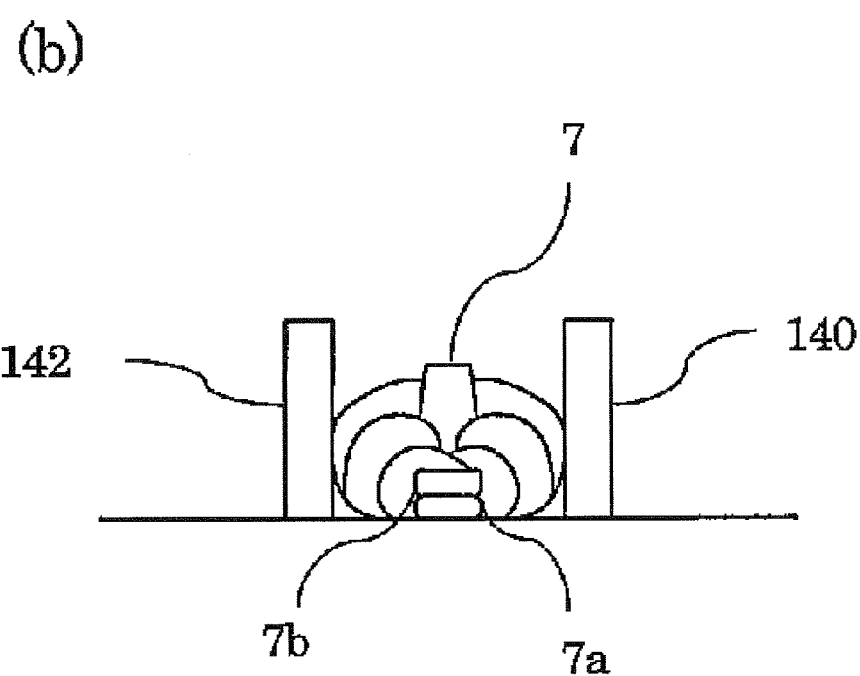
Figures 8, 9, 10:
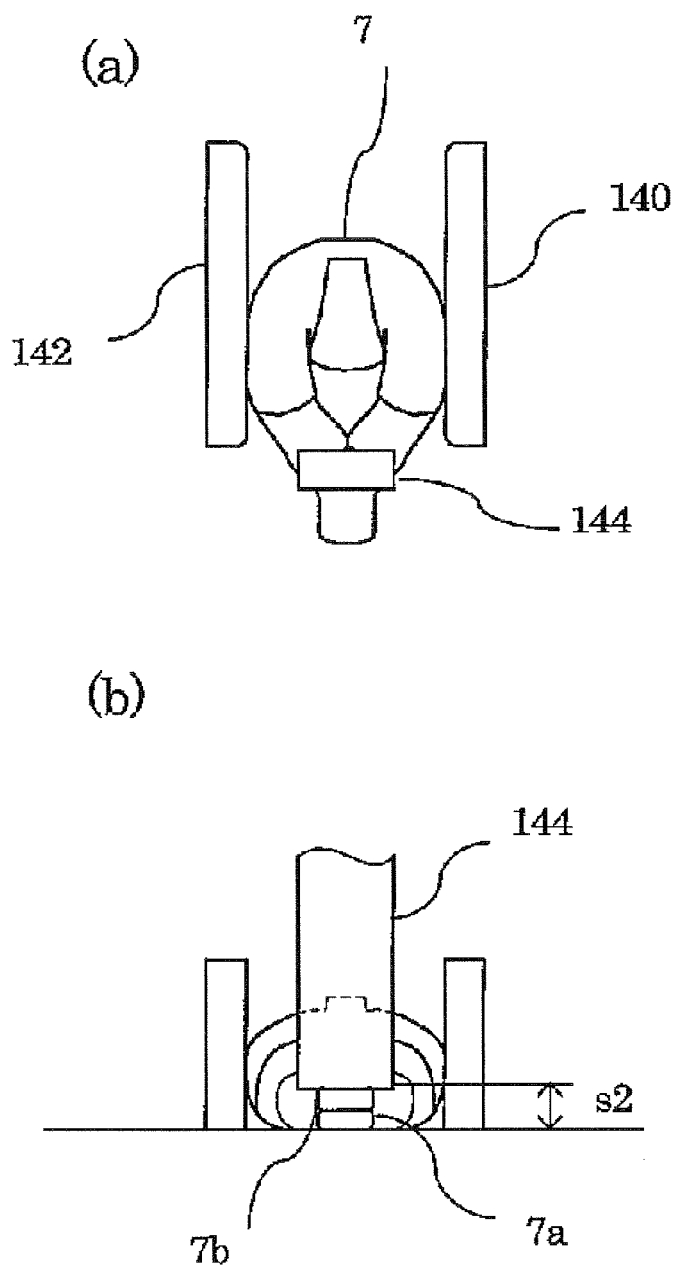

The second pusher 144 is vertically moved by a driver 145 so as to again vertically press the first and second ends 7a, 7b that are stuck together (see FIG. 8-10). The second pusher 144 is wider than the gap between the walls that are made of the face 114f of the first guide 114 and the face 116f of the second guide 116, i.e., the length of the croissant dough 7 in the direction perpendicular to the direction for conveyance. For example, the second pusher 144 is formed to be wider in the direction perpendicular to the direction for conveyance that is greater than the length in the direction for conveyance. The second pusher 144 has a face for pressing the first and second ends 7a, 7b. That face is typically flat, but may be curved. The shape of that face is arbitrary, but is generally rectangular. The second pusher 144 is typically made of metal. It is made of a material that does not deform or adhere to the croissant dough 7 when pressing the first end 7a and the second end 7b. A hole for blowing air 146 is formed in the face for pressing the first end 7a and the second end 7b (see FIG. 8-11) to blow air that is supplied from a source of air (not shown).

For the second pusher 144 the time for pressing the first end 7a and the second end 7b and the travel to move downward to press them (i.e., the height s2 from the face for conveyance of the conveyor 124 when the second pusher 144 is lowered [see FIG. 8-10]) are adjustable. By adjusting the time for the second pusher 144 to press the first end 7a and the second end 7b or the travel for the second pusher 144 to move downward for pressing them, or both, the degree (strength) to cause the first end 7a and the second end 7b to be stuck together can be regulated.

Further, since the positions to stop the croissant dough 7 within the working positions for the second holders 140, 142 and the second pusher 144 can be precisely adjusted, the position for the second pusher 144 to press the first end 7a and the second end 7b is regulated. Since the position for the second pusher 144 to press them is regulated and the degree (strength) to cause them to be stuck together is also regulated, the length L5 of the ends that are stuck together can be regulated. Thus since the second pusher 144 presses the first end 7a and the second end 7b, the croissant dough as a whole becomes round. Further, the shape of the croissants after baking can be regulated, to thereby produce the croissants in a desired shape.

For example, the drivers 104, 105, 106, 107, 108, 141, 143, 145 of the device for circularizing the croissant dough 100 may be direct-acting-type air cylinders. However, any other known driver may be used. The positions for driving and the strokes of these drivers can be regulated so as to follow the change of the size of the croissant dough to be shaped.

Next, a system for producing croissants 1 that includes the device for forming the croissant dough in a U-shape 10 and the device for circularizing the croissant dough 100 is discussed. In the upstream side of the device for forming the croissant dough in a U-shape 10, the system for producing croissants 1 has a device for producing croissant dough, a device for flattening the croissant dough, a cutter for cutting the flattened croissant dough, and a device for rolling up the croissant dough. The device for producing croissant dough interfolds fat with dough that is produced by kneading raw materials to form "roll-in dough," which is a laminate of dough and fat, and folds the roll-in dough to produce the croissant dough. The device for flattening the croissant dough flattens the croissant dough into a thin sheet. The cutter for cutting the flattened croissant dough cuts the flattened croissant dough into triangular sheets. The device for rolling up the croissant dough rolls up the triangular croissant dough so that the center is thick, but becomes less thick toward the ends. The system for producing croissants 1 may include conveyors to convey the croissant dough between these devices.

The system for producing croissants 1 may include a part for turning over the croissant dough in the downstream side of the device for circularizing the croissant dough 100. The part for turning over the croissant dough turns over the circularized croissant dough 7 so that the upstream portion comes downstream and vice versa. In the embodiment of FIGS. 1 and 2 the conveyor 150, which is in the downstream side of the conveyor 124, is positioned so that a step is formed between them. When the croissant dough 7 drops at that step, it is turned over so that the upstream portion comes downstream and vice versa. The system for producing croissants 1 further includes a chamber for causing the croissant dough 7 to rise and an oven for baking the risen croissant dough 7 to finish the croissants.

Since the device for producing croissant dough, the device for flattening the croissant dough, the cutter for cutting the flattened croissant dough, the device for rolling up the cut croissant dough, the chamber for causing the croissant dough to rise, and the oven for baking the risen croissant dough, may be known ones, the detailed discussion for them is omitted. Further, a combined device, such as a device for producing and flattening croissant dough that is a combination of the device for producing croissant dough and the device for flattening the croissant dough, may be used. Further, some of the devices may possibly not be included. For example, if croissant dough that has been kneaded and folded is carried to the system, then the device for producing croissant dough may not be included.

Next, a method for producing croissant dough by using the system for producing croissants 1 that includes the device for forming the croissant dough in a U-shape 10 and the device for circularizing the croissant dough 100 is discussed. Raw material for the croissant dough, such as flour, sugar, salt, butter, and yeast, are kneaded with water by a mixer to produce dough. The device for producing the croissant dough interfolds fat with sheet-like dough and folds the roll-in dough to produce croissant dough that is a laminate of the dough and the fat. The croissant dough is conveyed to the device for flattening the croissant dough to be flattened into a thin sheet. Next, the cutter cuts out triangular sheets of the croissant dough from the flattened croissant dough. The device for rolling up the dough rolls up the triangular sheets of the croissant dough so that the center is thick, but becomes less thick toward the ends. Specifically, the triangular sheet is rolled up from the base to the top of the triangle. The bar-shaped croissant dough 3 that has been rolled up is placed on the conveyor 22 as in FIG. 1 so that its longitudinal axis is perpendicular to the direction for conveyance.

The croissant dough 3 that is conveyed by the conveyor 22 is transferred to the downstream conveyor 24. The croissant dough 3 is also conveyed on the conveyor 24 so that its longitudinal axis is perpendicular to the direction for conveyance. The water feeder 70 is provided on the conveyor 24. When the croissant dough 3 passes by the water feeder 70 the sponge 74 of the water feeder 70 contacts an end of the croissant dough 3 (the end that is the lower one in FIG. 1, which is the first end 5a at the later step) to attach water.

The croissant dough 3, a part of which water is attached to, is transferred to the downstream conveyor 26. The croissant dough 3 is also conveyed on the conveyor 26 so that its longitudinal axis is perpendicular to the direction for conveyance. First the croissant dough 3 on the conveyor 26 is conveyed to the position under the belts for suppressing and rolling the croissant dough 60. Further, it is conveyed to the device for grooving 50. There two grooves 6 are made by the blades 52 on the thick portion that is rolled up.

The croissant dough 3 that is grooved with grooves 6 contacts the belts 60. It is transported by the conveyor 26 and the belts 60 in the downstream direction. The rate for the transportation of the belts 60 is less than that of the conveyor 26 or the direction for the transportation of the belts 60 is reverse to that of the conveyor 26. Thus the croissant dough 3 is rolled about its longitudinal axis by about 90 degrees. By being rolled, the grooves 6 on the croissant dough 3 face upward.

The first sensor for detecting the croissant dough 38 detects that the rolled croissant dough 3 is passing through a predetermined position. When the sensor 38 detects the croissant dough 3 a signal is sent to the controller (not shown) so that the controller generates a signal to timely activate the device for the center pin 30. Here, "timely" means the timing for the center pin 32 to push the croissant dough 3 that is conveyed on the conveyor 26 before it reaches the side belts 40 so as to feed it to the side belts 40. The side belts 40 may be activated by a signal from the sensor 38.

The croissant dough 3 is pushed by the center pin 32 at its center while being conveyed by the conveyor 26. Since the center is pushed, the croissant dough 3 is formed to be an arc where the center advances to the downstream direction further than do the ends. Since the grooves 6 are made in the upstream portion of the croissant dough 3, the croissant dough 3 is easily formed to be an arc where the center advances to the downstream direction than do the ends.

The croissant dough 3 that is pushed by the center pin 32 at the center and that is deformed to be an arc where the center advances to the downstream direction further than do the ends is fed to the space between the pair of side belts 40. There the center pin 32 moves upward by the rotation of the belt for the center pin 34 and separates from the croissant dough 3. Since the arc-shaped croissant dough 3 moves to the space between the pair of side belts 40 that is narrower than the distance between the ends of the croissant dough 3, that distance narrows to equal the distance between the side belts 40 so that the croissant dough 3 becomes U-shaped. The U-shaped croissant dough 5 is conveyed by the conveyor 26 and the side belts 40 at the rate for conveyance V.

Figure 7:
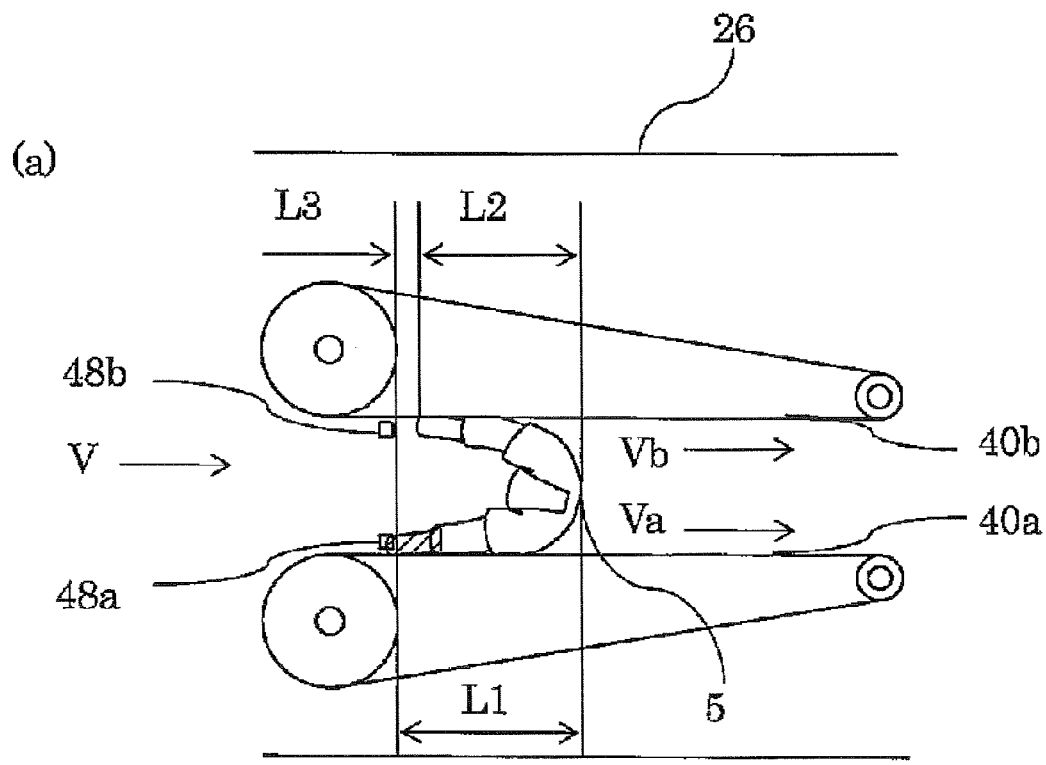
FIG. 7 is a plan view that illustrates how the side belts arrange both legs of the U-shaped croissant dough to have the same length.
Figure 7:
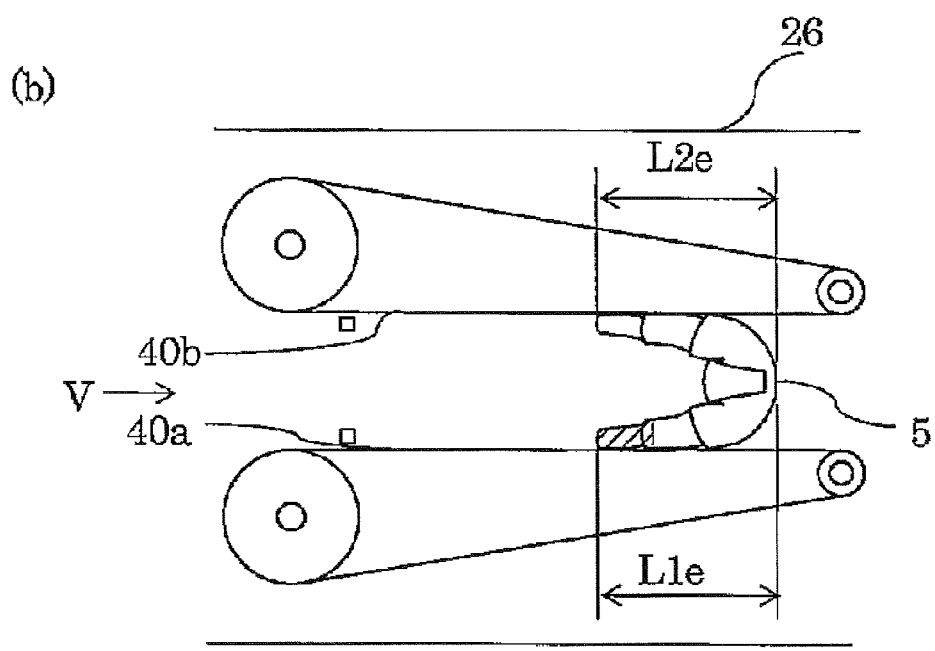

The lengths L1, L2 of the legs of the U-shape of the U-shaped croissant dough 5 are measured by the sensor 48 (see FIG. 7). Alternatively, the distance between the positions of the tips of the legs L3 may be measured. Though the center of the rolled up croissant dough 3 that has the thick center is pushed by the center pin 32 and both sides of it are enfolded by the side belts 40, it is not necessarily bent at the center. Actually, it is often bent at a position slightly off center, i.e., with a deflection. Thus based on the lengths of the legs measured by the sensor 48 or the distance between the positions of the tips of the legs, the lengths of the legs are arranged to have the same length and without any deflection.

Based on the lengths L1, L2 of the legs as measured by the sensor 48 or the distance L3 between the positions of the tips of the legs, the rates for transporting the respective legs Va, Vb by the side belts 40$a$, 40$b$ are adjusted. As shown in FIG. 7($a$) for example, if one leg (the lower one in the figure) is longer, the rate Va for transporting that leg by the side belt 40$a$ is increased to be faster than the rate for conveying the dough by the conveyor V. Thus the lengths of the legs L1$e$, L2$e$ are arranged to have the same length as shown in FIG. 7($b$). Alternatively, the rate Vb for transporting the leg by the side belt 40$b$ may be decreased to be slower than the rate for conveyance V. Since the contacting condition between the side belts 40 and the croissant dough 5 is less slippery than the contacting condition between the conveyor 26 and the croissant dough 5, the lengths of the legs can be regulated by adjusting the rates for transporting the legs by the side belts 40. Since the side belts 40 move so that the points on the side belts 40 that correspond to the tips of the respective legs come to the line that is perpendicular to the direction for conveyance of the conveyor 26 (that is, the rates Va, Vb of the side belts 40$a$, 40$b$ are adjusted relatively), the lengths L1$e$, L2$e$ are arranged to have the same length. Thus the lengths L1$e$, L2$e$ are accurately and quickly arranged to have the same length. The rate Va or Vb for transporting the leg by the side belts 40 is returned to the rate for conveyance V when the lengths L1$e$, L2$e$ of the legs of the croissant dough 5 are arranged to have the same length. The croissant dough 5 is transferred to the downstream conveyor 122.

The second sensor for detecting the croissant dough 138 detects that the croissant dough 5 with the legs that have their lengths arranged to have the same length is passing through a predetermined position. When the sensor 138 detects the croissant dough 5 a signal is sent to the controller (not shown). The controller generates a signal to timely stop the conveyor 122 and a signal to timely activate the principal part 102. Here, "timely" means timing for the croissant dough 5 to reach the working positions for the principal part 102.

When the croissant dough 5 reaches the working positions for the principal part 102, the conveyor 122 stops so that the croissant dough 5 remains in the working positions for the principal part 102. Or, the croissant dough 5 may be clamped by the holders 110 and 120 so that it is not conveyed so as to remain in the working positions for the principal part 102. Or, the principal part 102 as a whole may be moved in the downstream direction at the same speed as that of the conveyor 122 so that the croissant dough is circularized.

Below, with reference to FIGS. 8-1 to 8-12, a method for circularizing the croissant dough 5 is discussed in detail. First, as shown in FIGS. 8-1 and 8-2, the first holders 110, 112 enfold the legs of the U-shaped croissant dough 5 from the sides to hold the croissant dough 5. Simultaneously, the first guide for reducing the width 114 moves toward the center of the conveyor 122 so as to move the first end 5$a$ of the croissant dough 5 to the center of the U-shape. Since the holders 110, 112 hold the croissant dough 5 from the sides, the croissant dough 5 as a whole is not moved when the first end 5$a$ is moved to the center. In the embodiment as shown in FIGS. 8-1 to 8-7, the holder 110 is integrated with the first guide for reducing the width 114. By doing two things at the same time, i.e., enfolding the croissant dough 5 from the sides by the holders 110, 112 and moving the first end 5$a$ to the center by the first guide for reducing the width 114, the working time can be reduced.

The plate 118 that is placed on the conveyor 122 moves to the center of the conveyor 122 so as to slip under the second end 5$b$. After the plate 118 slips under the second end 5$b$, the plate 118 and the second guide for reducing the width 116 move upward to lift the second end 5$b$. The height h to which the second end 5$b$ is to be lifted is one where the lower face of the second end 5$b$ is higher than the upper face of the first end 5$a$.

Figure 3:
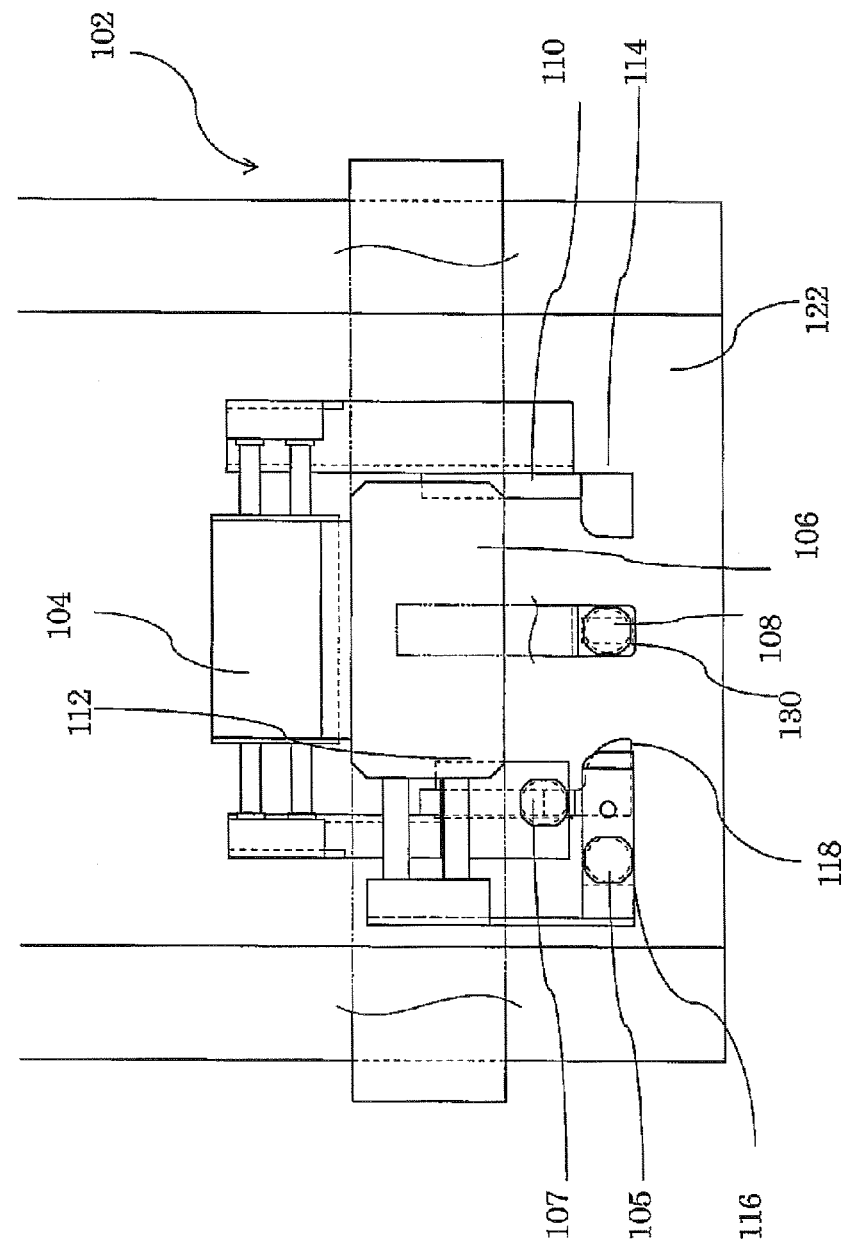
FIG. 3 is a plan view of the principal portion of the device for circularizing the croissant dough of FIG. 1.

After the second end 5$b$ is lifted, the second guide for reducing the width 116 moves on the plate 118 to the center of the conveyor 122 as in FIG. 8-3. In so doing this, the second guide for reducing the width 116 moves over the end of, or to the end of, the plate 118, near the center. The second guide for reducing the width 116 moves the second end 5$b$ to the center of the U-shape. That is, the second end 5$b$ is moved above the first end 5$a$. The second end 5$b$ may be lifted before the first end 5$a$ is moved to the center.

When the second end 5$b$ is moved to the center, since the plate 118 does not support it, it is lowered to overlap the first end 5$a$. If the second end 5$b$ is moved to the center before the first end 5$a$ does so, the first end 5$a$ must be moved to the center before the second end 5$b$ is lowered to the height of the upper face of the first end 5$a$. The first end 5$a$ and the second end 5$b$ are the portions of the croissant dough 5 from the tips to the overlapped part. Though one of the tips overlaps the other in FIG. 8-3, the first end 5$a$ and the second end 5$b$ may cross, and so no tip may overlap the other one. The positions where the first guide 114 presses the first end 5$a$ and the second guide 116 presses the second end 5$b$ can be regulated by slightly adjusting the timing to stop the conveyor 122 after the sensor 138 detects the croissant dough 5, i.e., slightly adjusting the position where the conveyor 122 stops in relation to the principal part 102. As a result, the part where the first end 5$a$ and the second end 5$b$ overlap can be easily regulated.

Figure 4:
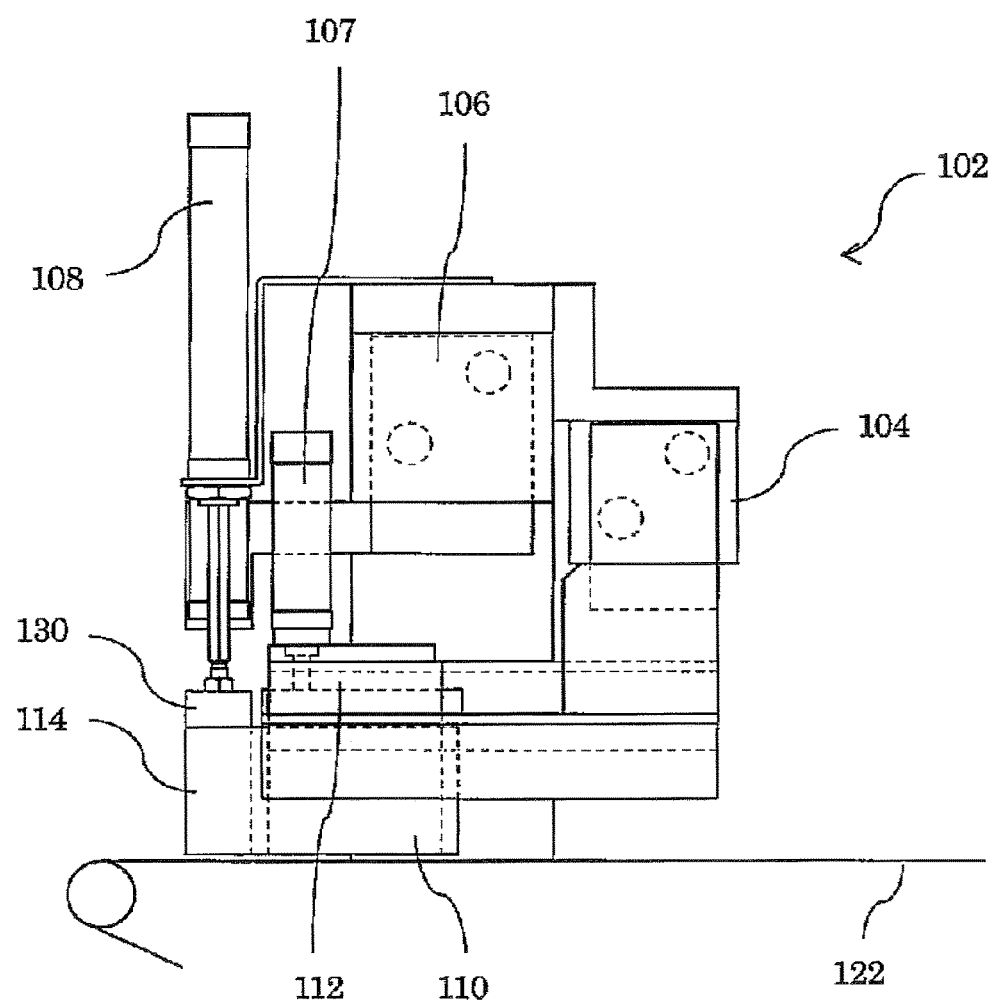
FIG. 4 is a front view of the principal portion of the device for circularizing the croissant dough of FIG. 3.

After the second end 5$b$ is moved to the center, the plate 118 is lowered to the face of the conveyor 122 as in FIG. 8-4. The second guide for reducing the width 116 is also lowered by the same travel h. The overlapping second end 5$b$ and first end 5$a$ are wedged between the face 114$f$ of the first guide 144 for moving the first end 5$a$ and the face 116$f$ of the second guide 116 for moving the second end 5$b$. That is, the face 114$f$ and the face 116$f$ act as walls for the first end 5$a$ and the second end 5$b$, respectively.

As shown in FIG. 8-5, the pusher 130 moves downward between the walls of the face 114$f$ and the face 116$f$, to press the overlapping second end 5$b$ and first end 5$a$ so that they are stuck together. Since water is attached to the first end 5$a$, they are easily stuck together. Further, since the walls 114$f$, 116$f$ are provided on the sides of the first end 5$a$ and the second end 5$b$, no croissant dough 5 spreads laterally when it is pressed. Thus the portions that are pressed by the pusher 130 are securely stuck together. Specifically, the croissant dough 5 spreads between the walls 114$f$, 116$f$. However, since the gaps between the pusher 130 and the walls 114$f$, 116$f$ are small, no substantial effect exists. By adjusting the time for the pusher 130 to press the first end 5$a$ and the second end 5*b* or the height of the pusher 130 to be lowered (the distance s between the face of the pusher 130 for pressing and the face for conveyance of the conveyor 122), the degree (strength) to cause the ends to be stuck together can be regulated. Thus the length of the overlapped legs of the croissants after baking can be changed. Further, by adjusting the position in the direction for conveyance to stop the croissant dough 5 in relation to the pusher 130, the length L4 of the stuck legs (see FIG. 8-7) can be easily regulated. Thus the croissants after baking can be formed in a desired shape.

Figure 6:
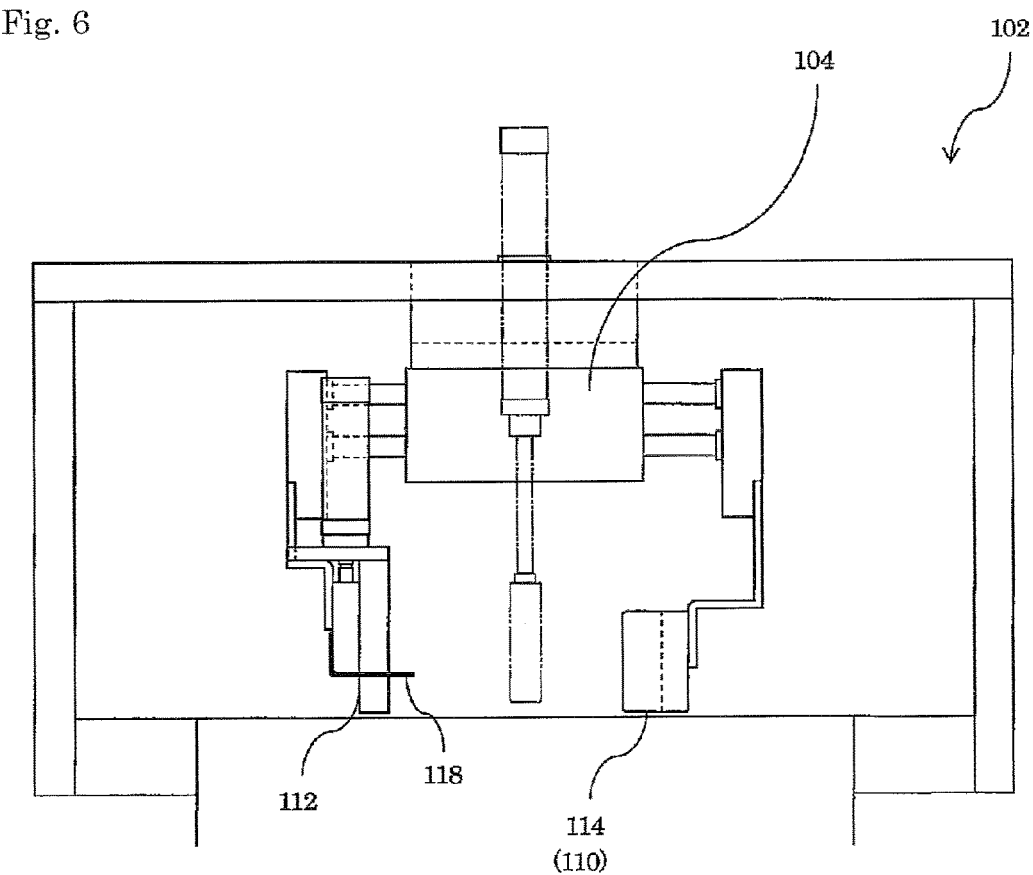
FIG. 6 is a side view of the principal portion of the device for circularizing the croissant dough of FIG. 5, with the second guide for reducing the width being omitted.

After the pusher 130 vertically presses the first end 5*a* and the second end 5*b*, it blows air A through the hole for blowing air 136 as in FIG. 8-6. Since air A is blown, the pusher 130 is separated from the croissant dough 7. While blowing air A, or after blowing air A, the pusher 130 moves upward.

After the first and second ends 7*a*, 7*b* are pressed to be stuck together, the holders 110, 112, the first guide 114, the second guide 116, and the plate 118 retract as in FIG. 8-7. After the holders 110, 112, the first guide 114, the second guide 116, and the plate 118 retract, the conveyor 122 is reactivated so that the circularized croissant dough 7 with the ends being stuck together is conveyed in the downstream direction.

The circularized croissant dough 7 is transferred to the downstream conveyor 124. The third sensor 148 detects when the circularized croissant dough 7 is passing through a predetermined position. When the sensor 148 detects the croissant dough 7 a signal is sent to the controller. The controller sends a signal to timely stop the conveyor 124 and a signal to timely activate the second holders 140, 142. Here, "timely" means the timing for the croissant dough 7 to reach the working positions for the second holders 140, 142 and the second pusher 144.

As shown in FIG. 8-8, when the croissant dough 7 reaches the working positions for the second holders 140, 142 and the second pusher 144, the conveyor 124 stops so that the croissant dough 7 remains in the working positions for the second holders 140, 142 and the second pusher 144. Or, the croissant dough 7 may be clamped by the holders 140 and 142 so that it is not conveyed, so as to remain in the working position for the pusher 144. Or, the second holders 140, 142 and the second pusher 144 as a whole may be moved in the downstream direction at the same speed as that of the conveyor 124, so that the end of the croissant dough is stuck together while being conveyed in the downstream direction.

As shown in FIG. 8-9, the second holders 140, 142 clamp from the sides the croissant dough 7, which remains in the working position, to hold it. After holding the croissant dough 7 by the second holders 140, 142, the ends 7*a*, 7*b* of the croissant dough 7 that are stuck together are again vertically pressed by the second pusher 144 as in FIG. 8-10. Since the second pusher 144 is wider than the pusher 130 (in the width direction of the conveyor 124), the portion to be stuck spreads out, so that the circularized croissant dough 7 as a whole is rounded. That is, the pusher 130 causes the first end 5*a* and the second end 5*b* to stick together mainly in the longitudinal direction (the direction for conveyance), and the second pusher 144 has them stick together mainly in the width direction. By precisely adjusting the time to stop the conveyor 124 after the sensor 148 detects the croissant dough 7, the positions of the first and second ends 7*a*, 7*b* to be pressed can be easily regulated. In the embodiment of FIGS. 8-9 and 8-10, the conveyor 124 is stopped so that the portion to be pressed by the pusher 144 overlaps part of the portion pressed by the pusher 130. The pusher 144 is vertically moved to press the first and second ends 7*a*, 7*b*. Thus the length L5 of the first and second ends 7*a*, 7*b* that are stuck together becomes long. By again pressing the first and second ends 7*a*, 7*b* by the second pusher 144, which is wide, the croissant dough 7 is rounded. Like the pressing by the pusher 130, by adjusting the time for the second pusher 144 to press the first end 7*a* and the second end 7*b*, or the height of the second pusher 144 to be lowered, i.e., the distance s2 between the face of the second pusher 144 for pressing and the face for conveyance of the conveyor 124, or the position to be pressed by the second pusher 144, the length L5 of the first and second ends 7*a*, 7*b* that are stuck together can be regulated. Thus the croissants after baking can be formed in a desired shape.

After the second pusher 144 vertically presses the first and second ends 7*a*, 7*b*, it blows air A through the hole for blowing air 146 as in FIG. 8-11. Since the air A is blown, the second pusher 144 is separated from the croissant dough 7. While blowing air A or after blowing air A the second pusher 144 moves upward.

After the first and second ends 7*a*, 7*b* are pressed by the second pusher 144, the second holders 140, 142 retract as in FIG. 8-12. After the second holders 140, 142 retract, the conveyor 124 is reactivated so that the circularized and rounded croissant dough 7 is conveyed in the downstream direction.

The discussion on the method for producing the croissants by using the system for producing croissants 1 is now continued. The circularized and rounded croissant dough 7 is transferred from the conveyor 124 to the conveyor 150. The face for conveyance of the conveyor 150 is lower than that of the conveyor 124 so that a gap is provided between the conveyor 124 and the conveyor 150. The height of the gap is determined so that the croissant dough is turned over when it drops over the gap. That is, the two faces of the croissant dough 7 are altered. Thus the croissant dough 7 that is placed on the conveyor 124 so that the thick portion is at the upstream side and the stuck ends 7*a*, 7*b* are at the downstream side is turned and is placed on the conveyor 150 so that the stuck ends 7*a*, 7*b* are at the upstream side and the thick portion is at the downstream side. In the embodiment of FIG. 1 the end of the dough that is rolled up is directed from the inside toward the outside of the circularized croissant dough 7 in the device for circularizing the croissant dough 100. If that croissant dough 7 is baked as it is, the surface of the end of the dough that is rolled up (upper face) of the croissant is directed toward the outside. Its appearance is not good. Thus the dough is turned over so that the end of the dough that is rolled up is directed toward the inside. Depending on the direction for rolling the croissant dough by a device for rolling dough, the end of the dough that is rolled up may be directed toward the inside of the circle. In this case, the croissant dough 7 is not turned over.

The turned over croissant dough 7 is conveyed to the chamber for causing croissant dough to rise. The chamber for causing croissant dough to rise is heated at the temperature that is suitable for causing the croissant dough 7 to rise. In the chamber the croissant dough 7 is heated at a predetermined temperature for a predetermined time, to cause it to rise. As the croissant dough 7 rises, it becomes large. When it becomes large, a force to return its shape to a bar is generated. However, since the end 7*b* overlaps the end 7*a* and they are vertically pressed to be stuck together, they do not easily separate, and so the circle is maintained. In fact, the croissant dough 7 rises at room temperature. However, rising at room temperature is slow. The degree to rise during the conveyance from the device for producing the croissant dough to the chamber for causing the croissant dough to rise is generally so little that assuming that no dough rises at room temperature causes no substantial problem. The croissant dough may rise at room temperature for a long time without heating it in the chamber.

The croissant dough that has risen in the chamber for causing the croissant dough to rise is conveyed to the oven for baking. At the oven the risen croissant dough is baked to become complete croissants. The croissant dough is turned over when it is transferred from the conveyor 124 to the conveyor 150 so that the end of the rolled up dough is directed toward the inside, and it is baked. Thus the appearance of the baked croissants matches the common image of the croissants. The baked croissants are taken out from the oven to be sent to the following step, such as packing.

As discussed above, by the system for producing croissants 1, while being continuously conveyed by the conveyors 20, 12, 150 the rolled-up croissant dough 3 is formed to be in a U-shape, the lengths L1e, L2e of the legs of the U-shape are arranged to have the same length, the croissant dough 5 is circularized to form the circularized croissant dough 7, and the circularized croissant dough 7 is caused to rise, and then baked. Thus the croissants are quickly produced. That is, many croissants are produced. Further, since the lengths of the legs of the U-shaped croissant dough 5 are arranged to have the same length, and the length of the overlapped portion of the ends 5a, 5b is easily regulated when the croissant dough 5 is circularized, and the length L4 of the stuck ends is easily regulated, croissants in a desired shape can be quickly and stably produced. Further, since the end 5b of the croissant dough 5 overlaps the end 5a, and they are vertically pressed to be stuck together, the parts that are stuck together do not separate while being caused to rise. Thus the circularized shape is maintained. Further, since water is attached to the parts 5a 5b to be stuck together, they are strongly stuck together.

By the device for forming the croissant dough in a U-shape 10 or the method for forming the croissant dough in a U-shape as discussed above, the lengths L1, L2 of the legs of the U-shaped croissant dough 5 are arranged to have the same length by adjusting the rates of the pair of side belts 40. Thus the lengths L1e, L2e of the legs are accurately and quickly arranged to have the same length.

Further, since the contacting condition between the pair of side belts 40 and the croissant dough 5 is less slippery than the contacting condition for conveying the croissant dough 5 by the conveyor 28, the lengths L1e, L2e of the legs can be easily arranged to have the same length by adjusting the rate of each of the side belts 40.

By the device for circularizing the croissant dough 100 or the method for circularizing the croissant dough as discussed above, since the U-shaped croissant dough 5 that is being conveyed by the conveyor 122 is circularized, it is quickly circularized. Further, since the ends 5a, 5b of the croissant dough 5 overlap and are vertically pressed to be stuck together, the stuck ends 7a, 7b can be separated from each other only with difficulty. Thus, even when the croissant dough becomes large because it rises later, the circularized shape can still be maintained. That is, the croissant dough 7 is stably circularized.

Further, since the holders 110, 112 enfold the legs of the U-shaped croissant dough 5 from the sides to move the ends 5a, 5b to the center of the U-shape, the croissant dough 5 as a whole does not move, so that the ends 5a, 5b are reliably moved to the center. Thus the croissant dough 7, or the croissants, are produced in a desired shape.

Further, since the holder 110 and the first guide for reducing the width 114 are integrated so that the croissant dough 5 is enfolded from the sides by the holders 110, 112 at the same time as the first end 5a is moved to the center by the first guide 114, the cost for the device can be saved, the reliability of the device is increased, and the croissant dough 7 is quickly circularized.

Further, since the sensor 138 detects the croissant dough 5 that is being conveyed by the conveyor 122 and the conveyor 122 is stopped while the position to stop is adjusted so that the principal part 102 is activated, the length L4 of the overlapping portion of the first end 5a and the second end 5b is regulated to form the croissant dough 5 in a desired shape.

Further, since the time for the pusher 130 to press the first end 5a and the second end 5b and the height of the pusher 130 to be lowered for pressing them are adjustable, the degree (strength) to cause the first and second ends 7a, 7b to be stuck together is regulated. Thus the croissants in a desired shape after baking can be produced.

Further, since the walls that consist of the face 114f of the first guide 114 that moves the first end 5a and the face 116f of the second guide 116 that moves the second end 5b are provided for the overlapping ends 5a, 5b, and the pusher 130 presses the ends 5a, 5b between the walls, the ends 5a, 5b do not spread, and so can be securely stuck together.

Further, since the stuck ends 7a, 7b are vertically pressed by the second pusher 144, which is wide, the circularized croissant dough 7 is rounded. Thus the croissant dough 7, or the croissants, are produced in a desired shape.

Further, since the hole for blowing air 136 is formed in the pusher 130 so that air A is blown after the pusher 130 presses the ends 5a, 5b, the pusher 130 is separated from the stuck ends 7a, 7b by means of the air A. Thus the shape of the stuck ends 7a, 7b is not changed by the pusher 130, which moves upward.

Further, by adjusting the time for the pusher 130 to press the first end 5a and the second end 5b and the height of the pusher 130 to be lowered, the degree (strength) to cause the ends 7a, 7b to be stuck together can be adjusted so that the length of the overlapped portion of the product (baked croissants) is changed. By adjusting the position to stop the croissant dough 5 in the direction for conveyance in relation to the pusher 130, the length L4 of the stuck legs (see FIG. 8-7) can be easily regulated. That is, the croissant dough 7, or the croissants, are produced in a desired shape.

Though the device for forming the croissant dough in a U-shape 10 is explained to show that it feeds the U-shaped croissant dough 5 that has the legs with the same length to the device for circularizing the croissant dough 100, it may feed the U-shaped croissant dough 5 to a device other than the device for circularizing the croissant dough 100, such as a device for pinching dough parts as in U.S. Patent Application No. 2011/0097467. It may form bar-shaped dough with a thick center, but not the croissant dough 5, to be in a U-shape, and may arrange the legs to have the same length.

Further, though the pair of side belts 40 is explained to show that they form the croissant dough 3 that is fed by the device for the center pin 30 in a U-shape and to show that the side belts 40 arrange the legs to have the same length, the side belts 40 may be used for arranging the legs of croissant dough to have the same length, which croissant dough is preliminarily formed in a U-shape without using the device for the center pin 30.

Though the device for circularizing the croissant dough 100 is explained to show that it circularizes the croissant dough 5 that is formed in a U-shape by the device for forming the croissant dough in a U-shape 10, the U-shaped croissant dough 5 may be supplied from a device other than the device for forming the croissant dough in a U-shape 10.

Further, though the device for circularizing the croissant dough 100 is explained to show that it comprises the holders 110, 112 to enfold the croissant dough 5 from the sides, it may be comprise no holders 110, 112 to enfold the croissant dough 5 from the sides and may move the ends 5a, 5b toward the center.

Further, though the device for circularizing the croissant dough 100 is explained to show that the walls are provided by the face 114f of the first guide for reducing the width 114 and the face 116f of the second guide for reducing the width 116 so that the pusher 130 presses the ends 5a, 5b between the walls, the pusher 130 may press the ends 5a, 5b without the walls being provided.

Further, though the device for circularizing the croissant dough 100 is explained to show that it comprises the second pusher 144 and its related structures, it may comprise neither the second pusher 144 nor the related structures. Further, though it is explained to show that the second holders 140, 142 enfold the croissant dough 7 from the sides so that the second pusher 144 presses the ends 7a, 7b, it may comprise no second holders 140, 142, and the second pusher 144 may press the ends 7a, 7b without enfolding the croissant dough 7 from the sides.

Further, in the device for circularizing the croissant dough 100 the plate 118 may not lift the second end 5b. The second guide for reducing the width 116 may not vertically move. In this case, the first end 5a and the second end 5b are vertically pressed by the pusher 130 when they form a row in the width direction, and one end does not overlap the other end. Thus they are stuck together, but the degree is low. Therefore, when the croissant dough has risen or has been baked they may become unstuck so that the croissant dough is in a C-shape, not in a circle. If C-shaped or crescent-shaped croissants are to be produced, the device for circularizing the croissant dough 100 may be used by not vertically moving the plate 118 and the second guide for reducing the width 116.

In the device for circularizing the croissant dough 100, if neither the plate 118 nor the second guide for reducing the width 116 is vertically moved, the first end 5a and the second end 5b that are moved to the center of the U-shape may not be vertically pressed by the pusher 130. The croissant dough may tend to be a bar when it has risen or has been baked. However, depending on the Elasticity of the croissant dough, or on the degree to which it becomes large while being caused to rise, or on the required shape of the croissants as products, the croissant dough may be caused to rise and be baked without sticking the first end 5a and the second end 5b together.

Though the system for producing croissants 1 is explained to show that it comprises the water feeder 70 to attach water to the part of the ends 5a, 5b to be stuck together, it may comprise no water feeder 70 and comprise no water being attached to the part to be stuck to the other part.

Though the croissant dough that is formed by the side belts 40 and the principal part 102 and by the second holders 140, 142 and the second pusher 144, is explained to show that the legs are positioned in the downstream side of the central portion, to the contrary it may be formed so that the legs are positioned in the downstream side of the central portion, and the devices may be configured to fit that positioning. In this case the croissant dough is preliminarily formed in a U-shape to be fed to the side belts 40. For example, the apparatus disclosed by European Patent Application No. 1132003 may be used for the device for forming the croissant dough in a U-shape.

Below, the main reference numerals and symbols that are used in the detailed description and drawings are listed.

1 a system for producing croissants
3 rolled-up croissant dough
5 U-shaped croissant dough
5a, 5b ends of the croissant dough
6 a groove
7 circularized croissant dough
7a, 7b ends of the croissant dough that are stuck together
10 a device for forming the croissant dough in a U-shape
20, 22, 24, 26 conveyors
30 a device for a center pin
32 a center pin
34 a belt for the center pin
36 a motor for the center pin
38 a (first) sensor for detecting the croissant dough
40(40a, 40b) side belts
44(44a, 44b) motors for side belts
48(48a, 48b) sensors for measuring the lengths of the legs of the U-shaped croissant dough
50 a device for grooving to facilitate bending the croissant dough (a device for grooving)
52 blades
54 a shaft
56 a motor for grooving to facilitate bending the croissant dough (a motor for grooving)
60 a belt for pressing the croissant dough down and rolling the croissant dough
62 a roller
63 a middle roller
64 a driver for the belt
70 a water feeder
72 a nozzle
74 a sponge
100 a device for circularizing the croissant dough
102 a main part of the device for circularizing the croissant dough
104-108 drivers
110, 112 (first) holders
114 a first guide for reducing the width
114f a face of the first guide for reducing the width to move the first end (a wall)
116 a second guide for reducing the width
116f a face of the second guide for reducing the width to move the second end (a wall)
118 a plate
120, 122, 124 conveyors
130 a (first) pusher
136 a hole for blowing air
138 a second sensor for detecting the croissant dough
140, 142 second holders
141, 143 drivers
144 a second pusher
145 a driver
146 a hole for blowing air
148 a third sensor for detecting the croissant dough
150 a conveyor for turning the croissant dough over
A air
h a height to which the plate (the second guide for reducing the width) moves upward and returns
L1, L2 lengths of the legs of the U-shaped croissant dough
L3 a distance between the positions of the tips of the legs of the U-shaped croissant dough
L4 a length of the stuck ends of the legs of the croissant dough L5 a length of the stuck ends pressed by the second pusher
s a distance between the pusher and the face for conveyance of the conveyor
s2 a distance between the second pusher and the face for conveyance of the conveyor
V a rate for conveyance of the conveyor 26
Va, Vb rates for rotating the side belts 40*a*, 40*b* (rates for transporting the legs)

The invention claimed is:

1. A device for circularizing croissant dough that circularizes rolled-up croissant dough that has been bent at a center to be formed in a U-shape and is conveyed by a conveyor, the device comprising:
   a first guide for reducing a width that moves a first end of the U-shaped croissant dough toward a center of the U-shape, the first guide linearly moving toward, and retracting from, the center;
   a plate that is configured to reciprocate horizontally toward the center of the U-shaped croissant dough to slip under a second end of the U-shaped croissant dough and vertically moves upward to lift a lower face of the second end above an upper face of the first end;
   a second guide for reducing the width that is configured to move vertically upward with the plate and slides on, and relative to, the plate to move the second end of the croissant dough, that is lifted with the plate, toward the center of the U-shape, the second guide linearly moving toward, and retracting from, the center; and
   a pusher that vertically presses the first end and the second end that are moved to the center of the U-shape so as to stick one to the other.

2. The device for circularizing the croissant dough of claim 1 further comprising:
   a pair of holders that enfold the U-shaped croissant dough from both sides.

3. The device for circularizing the croissant dough of claim 2, wherein a holder of the pair of holders, which holder is positioned near the first end, is integrated with the first guide for reducing the width so that the U-shaped croissant dough is enfolded by the pair of holders at the same time as the first end is moved to the center of the U-shape by the first guide for reducing the width.

4. The device for circularizing the croissant dough of claim 1, further comprising:
   a conveyor that conveys the U-shaped croissant dough to working positions for the first guide for reducing the width, the plate, the second guide for reducing the width, and the pusher; and
   a sensor for detecting the croissant dough that detects the U-shaped croissant dough, to thereby generate a signal;
   wherein the conveyor is stopped based on a signal from the sensor for detecting the croissant dough, and wherein a timing to stop the conveyor is adjustable.

5. The device for circularizing the croissant dough of claim 1, wherein a timing to vertically press the first end and the second end together by the pusher or a distance to lower the pusher to press the first end and the second end together, or both, is adjustable.

6. The device for circularizing the croissant dough of claim 1, wherein the first guide for reducing the width has a face for moving the first end,
   wherein the second guide for reducing the width has a face for moving the second end,
   wherein after the second end is moved to the center of the U-shape the plate returns to a level that the plate had before the plate started to move upward,
   wherein the second guide for reducing the width moves downward at a same distance as the distance that the plate returns to a level that the plate had before the plate started to move upward,
   wherein the face for moving the first end and the face for moving the second end may form walls on both sides of the first end and the second end that are moved to the center of the U-shape, and
   wherein the pusher vertically presses the first end and the second end between the walls.

7. The device for circularizing the croissant dough of claim 6, further comprising:
   a second pusher that is wider than a distance between the walls and that further presses the first and second ends that have been vertically pressed by the pusher to be stuck together.

8. A device for forming croissant dough in a U-shape that supplies the U-shaped croissant dough to the device for circularizing the croissant dough of claim 1, the device for forming croissant dough in a U-shape comprising:
   a conveyor that conveys rolled-up croissant dough that is placed so that a longitudinal direction of the croissant dough is perpendicular to a direction for conveyance;
   a pair of side belts, wherein one side belt is provided on each side of the conveyor, and wherein the pair of side belts contact respective legs of the U-shaped croissant dough to transport the croissant dough in the direction for conveyance;
   a center pin that pushes a center of a length of the croissant dough that is conveyed by the conveyor in the direction for conveyance so as to feed the croissant dough to the pair of side belts; and
   a sensor that measures lengths of, or a distance between ends of, the legs of the U-shape;
   wherein based on the lengths of the legs of the U-shape or the distance between the ends of the legs of the U-shape measured by sensor rates for transporting the U-shaped croissant dough by of the pair of side belts are adjusted to arrange the legs of the U-shape to have the same length.

9. The device for forming croissant dough in a U-shape of claim 8, wherein a contacting condition between the pair of side belts and the croissant dough is less slippery than a contacting condition between the conveyor and the croissant dough for conveying the croissant dough.

10. A system for producing croissants comprising:
    a device for circularizing croissant dough that circularizes rolled-up croissant dough that has been bent at a center to be formed in a U-shaped croissant dough and is conveyed by a conveyor, comprising:
      a first guide for reducing a width that moves a first end of the U-shaped croissant dough toward a center of the U-shape, the first guide linearly moving toward, and retracting from, the center;
      a plate that is configured to reciprocate horizontally toward the center of the U-shaped croissant dough to slip under a second end of the U-shaped croissant dough and vertically moves upward to lift a lower face of the second end above an upper face of the first end;
      a second guide for reducing the width that is configured to move vertically upward with the plate and slides on, and relative to, the plate to move the second end of the croissant dough, that is lifted with the plate, toward the center of the U-shape, the second guide linearly moving toward, and retracting from, the center; and a pusher that vertically presses the first end and the second end that are moved to the center of the U-shape so as to stick one to the other; and a device for forming croissant dough in a U-shape that supplies the U-shaped croissant dough to the device for circularizing the croissant dough, comprising:

a conveyor that conveys rolled-up croissant dough that is placed so that a longitudinal direction of the croissant dough is perpendicular to a direction for conveyance;

a pair of side belts, wherein one side belt is provided on each side of the conveyor, and wherein the pair of side belts contact respective legs of the U-shaped croissant dough to transport the croissant dough in the direction for conveyance;

a center pin that pushes a center of a length of the croissant dough that is conveyed by the conveyor in the direction for conveyance so as to feed the croissant dough to the pair of side belts; and a sensor that measures lengths of, or a distance between ends of, the legs of the U-shape;

wherein based on the lengths of the legs of the U-shape or the distance between the ends of the legs of the U-shape measured by sensor rates for transporting the U-shaped croissant dough by the pair of side belts are adjusted to arrange the legs of the U-shape to have the same length.

* * * * *